(12) United States Patent  (10) Patent No.: US 7,110,411 B2
Saidi et al.  (45) Date of Patent: Sep. 19, 2006

(54) METHOD AND APPARATUS FOR WFQ SCHEDULING USING A PLURALITY OF SCHEDULING QUEUES TO PROVIDE FAIRNESS, HIGH SCALABILITY, AND LOW COMPUTATION COMPLEXITY

(75) Inventors: Hossein Saidi, Maryland Heights, MO (US); Chunhua Hu, St. Louis, MO (US); Peter Yifey Yan, St. Louis, MO (US); Paul Seungkyu Min, Clayton, MO (US)

(73) Assignee: Erlang Technology, Inc., Webster Groves, MO (US)

( * ) Notice: Subject to any disclaimer, the term of this patent is extended or adjusted under 35 U.S.C. 154(b) by 870 days.

(21) Appl. No.: 10/105,515

(22) Filed: Mar. 25, 2002

(65) Prior Publication Data

US 2003/0179774 A1 Sep. 25, 2003

(51) Int. Cl.
  *H04L 12/56* (2006.01)
(52) U.S. Cl. .................................. 370/395.4; 370/412
(58) Field of Classification Search ............ 370/395.1, 370/395.21, 395.4, 395.41, 395.42, 412, 370/413, 415, 417
  See application file for complete search history.

(56) References Cited

U.S. PATENT DOCUMENTS

| | | | |
|---|---|---|---|
| 5,526,352 A | 6/1996 | Min et al. | |
| 6,014,367 A | 1/2000 | Joffe | |
| 6,041,059 A | 3/2000 | Joffe et al. | |
| 6,049,059 A | 4/2000 | Kim | |
| 6,101,193 A | 8/2000 | Ohba | |
| 6,130,878 A | 10/2000 | Charny | |
| 6,611,522 B1 * | 8/2003 | Zheng et al. | 370/395.21 |
| 6,876,659 B1 * | 4/2005 | Aznar et al. | 370/395.1 |
| 6,909,720 B1 * | 6/2005 | Willis | 370/395.52 |
| 2002/0136230 A1 * | 9/2002 | Dell et al. | 370/416 |
| 2003/0076848 A1 * | 4/2003 | Bremler-Barr et al. | 370/412 |

(Continued)

FOREIGN PATENT DOCUMENTS

EP 0 843 499 5/1998

OTHER PUBLICATIONS

Goyal, Pawan; Vin, Harrick M.; and Cheng, Haichen; *Start-Time Fair Queueing: A Scheduling Algorithm for Integrated Services Packet Switching Networks*; IEEE/ACM Transactions on Networking, vol. 5, No. 5, Oct. 1997, pp. 690-704.

(Continued)

*Primary Examiner*—Phirin Sam
(74) *Attorney, Agent, or Firm*—Thompson Coburn LLP

(57) ABSTRACT

A method and apparatus is provided for scheduling access to a common resource for a plurality of objects queued in a plurality of connection queues. Tokens associated with the connection queues are stored in scheduling queues. Each scheduling queue has a scheduling weight assigned thereto. Each connection queue has a connection weight value assigned thereto. A serving value is used to determine which scheduling queue to select. When a scheduling queue is selected, an object stored in a connection queue having an associated token stored in the selected scheduling queue is provided to the common resource. Tokens are moved among the scheduling queues as a function of the connection weight values, scheduling weights, and serving value. The objects queued in the connection queues may be fixed length cells or variable length packets. When the objects are variable length packets, a residual weight value is also maintained for each connection queue, the residual weight values being useful to prevent the connection queues from receiving an undue amount of service relative to their connection weights during each serving cycle.

62 Claims, 17 Drawing Sheets

U.S. PATENT DOCUMENTS

2003/0081624 A1* 5/2003 Aggarwal et al. .......... 370/412
2003/0200339 A1* 10/2003 Greenblat et al. .......... 709/250

OTHER PUBLICATIONS

Golestani, S. Jamaloddin; *A Self-Clocked Fair Queueing Scheme for Broadband Applications*; Proceedings of IEEE INFOCOM 1994, pp. 636-646.

Katevenis, Manolis; Sidiropoulos, Stafanos; and Courcoubetis, Costas; *Weighted Round-Robin Cell Multiplexing in a General-Purpose ATM Switch Chip*; IEEE Journal on Selected Areas in Communications, vol. 9, No. 8, Oct. 1991, pp. 1265-1279.

Keshav, S.; *Congestion Control on Computer Networks*; PhD Thesis published as U.C. Berkley TR-654, Sep. 1991, pp. 19-25.

Ohba, Yoshihiro; *QLWFQ: A Queue Length Based Weighted Fair Queueing Algorithm in ATM Networks*; Proceedings of INFOCOM'97, 16th Annual Joint Conference of IEEE Computer and Communications Societies.

Parekh, Abhay K. and Gallager, Robert G.; *A Generalized Processor Sharing Approach to Flow Control in Integrated Services Networks: The Single-Node Case*; IEEE/ACM Transactions on Networking, vol. 1, No. 3, Jun. 1993, pp. 344-357.

Suri, Subhash; Varghese, George; and Chandranmenon, Girish; *Leap Forward Virtual Clock: A New Fair Queuing Scheme with Guaranteed Delays and Throughput Fairness*; IEEE INFOCOM'97.

Zhang, Hui and Keshav, Srinivasan; *Comparison of Rate-Based Service Disciplines*; Proceedings of ACM SIGCOMM'91; pp. 113-121.

Bennett and Zhang; "WF²Q: Worst-case Fair Weighted Fair Queueing"; *Proceedings of IEEE INFOCOM*; 1996; pp. 120-128.

Vishnu and Mark; "HOL-EDD: A Flexible Service Scheduling Scheme for ATM Networks"; *Proceedings of IEEE INFOCOM*; 1996; pp. 647-654.

Zhang; "VirtualClock: A New Traffic Control Algorithm for Packet Switching Networks"; *Proceedings of ACM SIGCOMM*; 1990; pp. 19-29.

Patent Cooperation Treaty; International Search Report; Sep. 19, 2003.

* cited by examiner

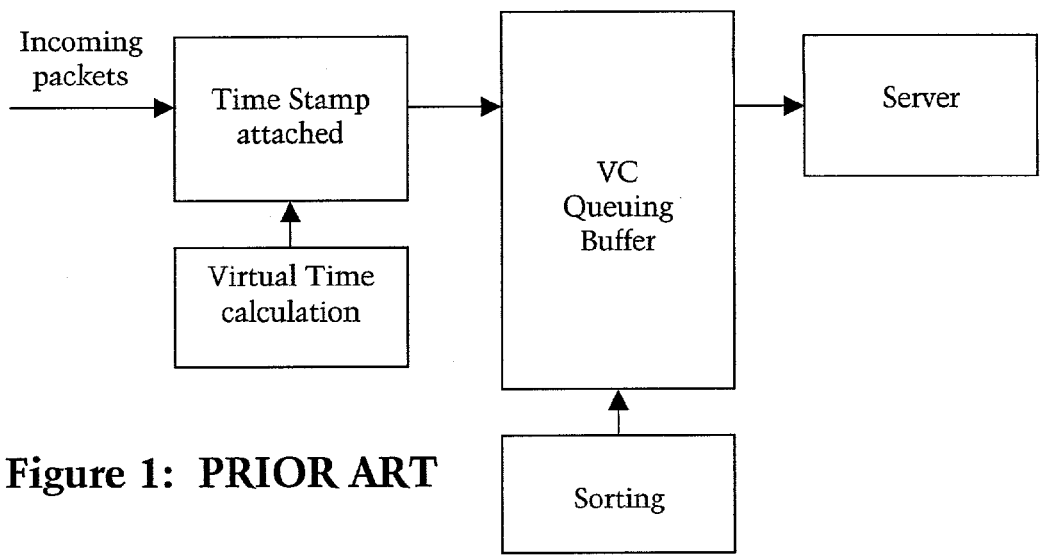
Figure 1: PRIOR ART
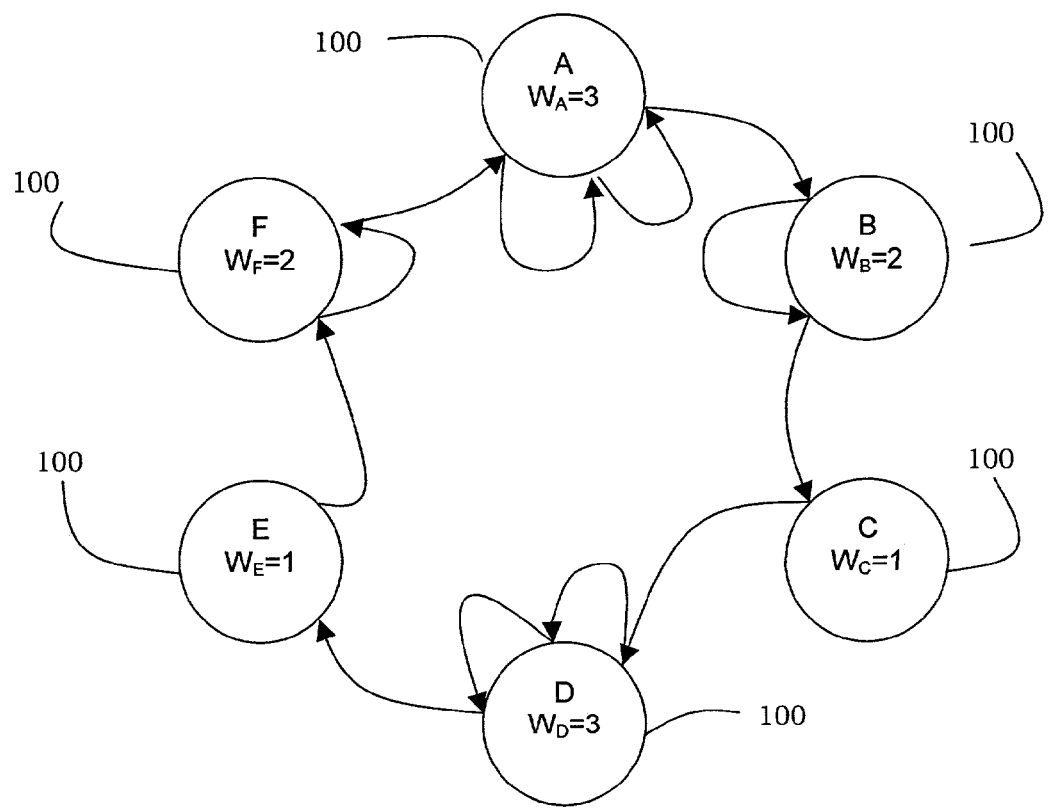
Figure 2(a): PRIOR ART

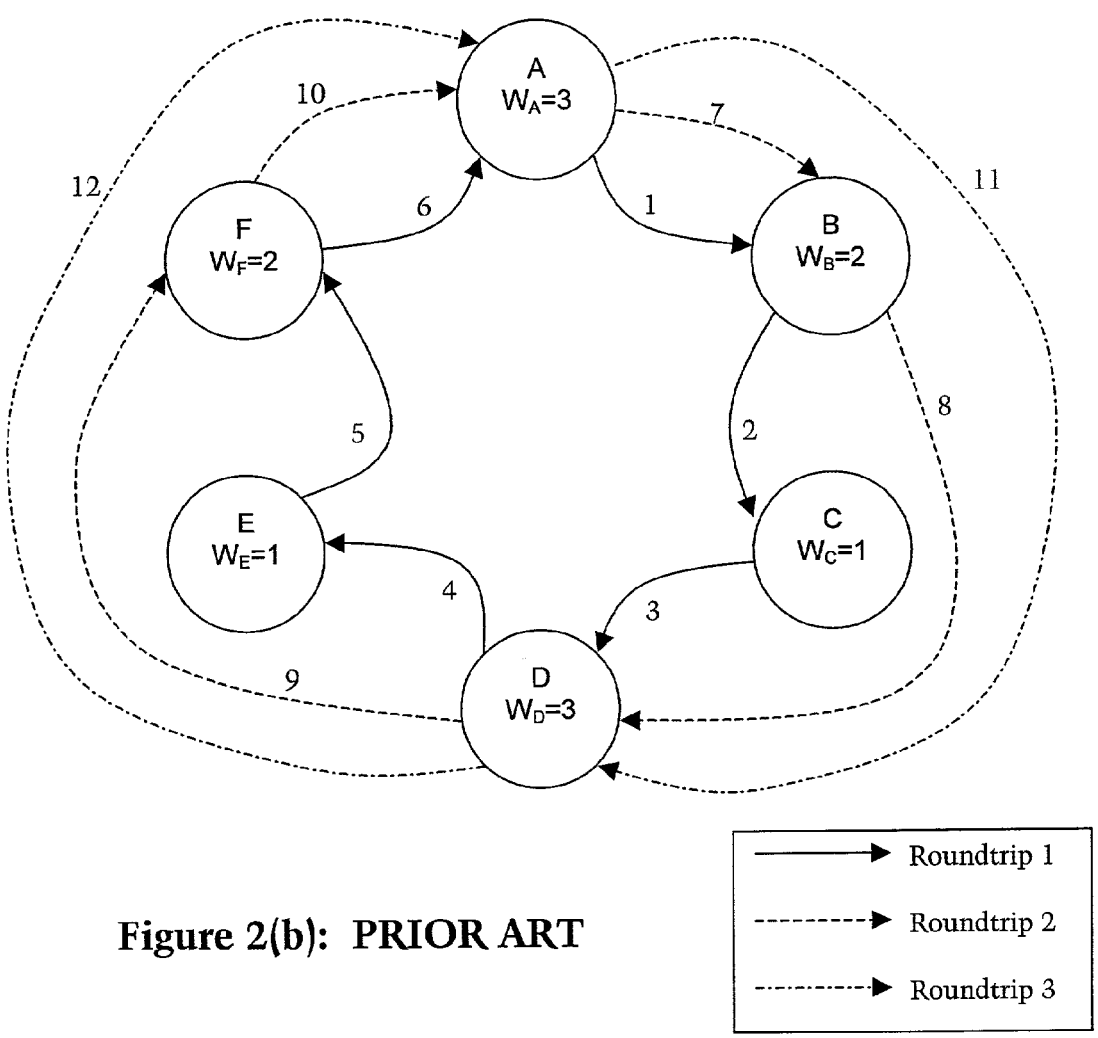
Figure 2(b): PRIOR ART

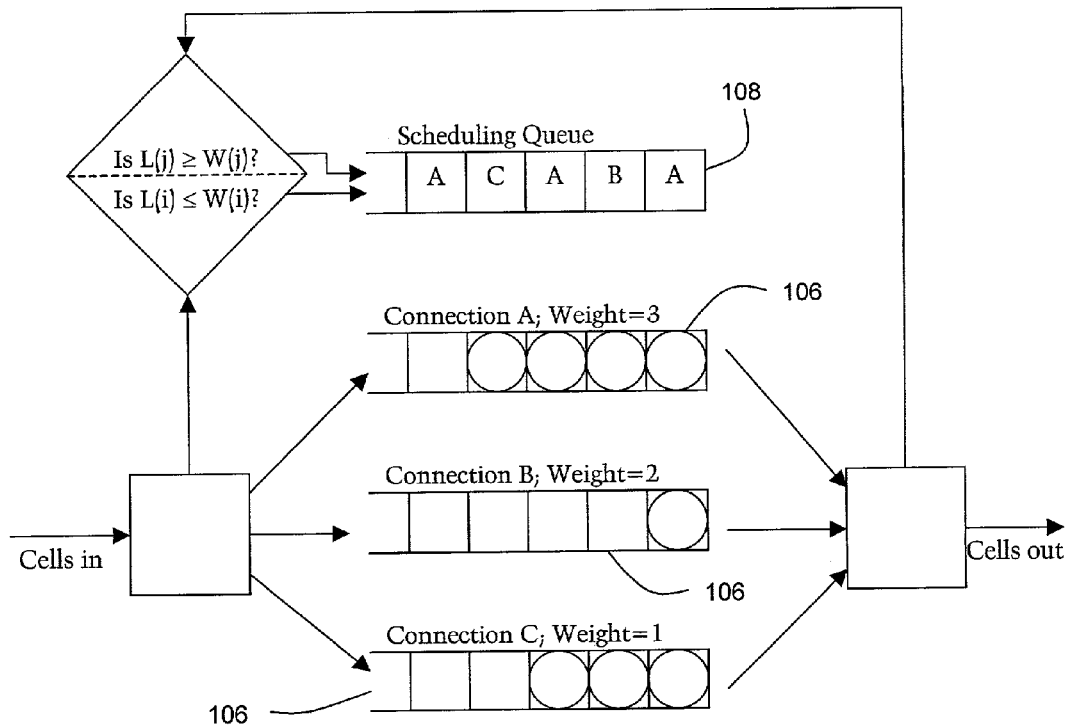
Figure 6: PRIOR ART
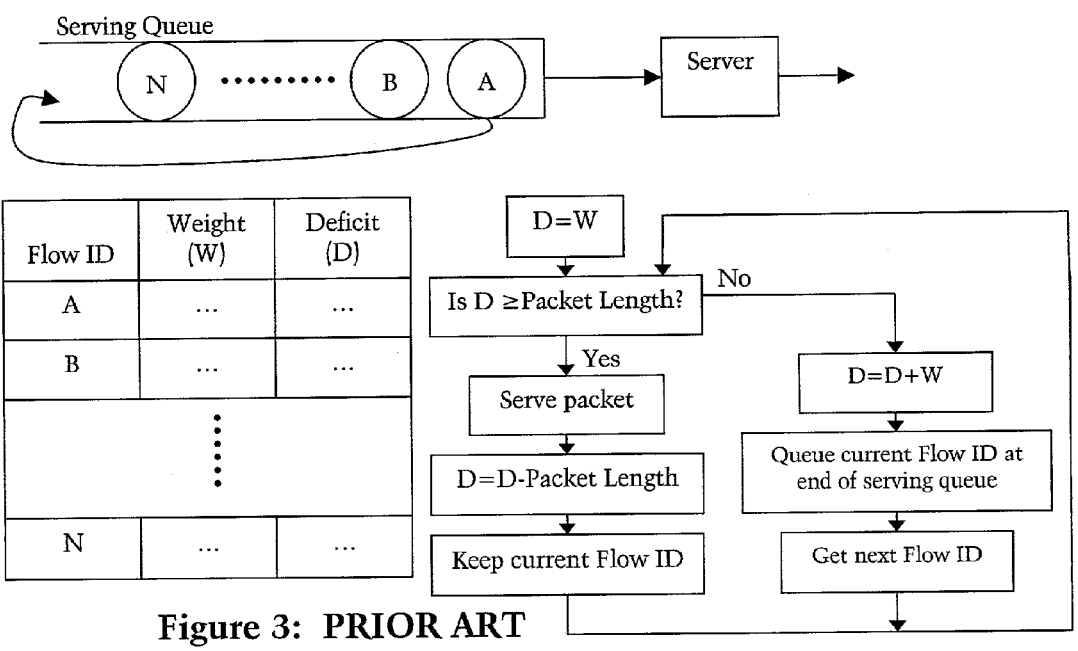
Figure 3: PRIOR ART

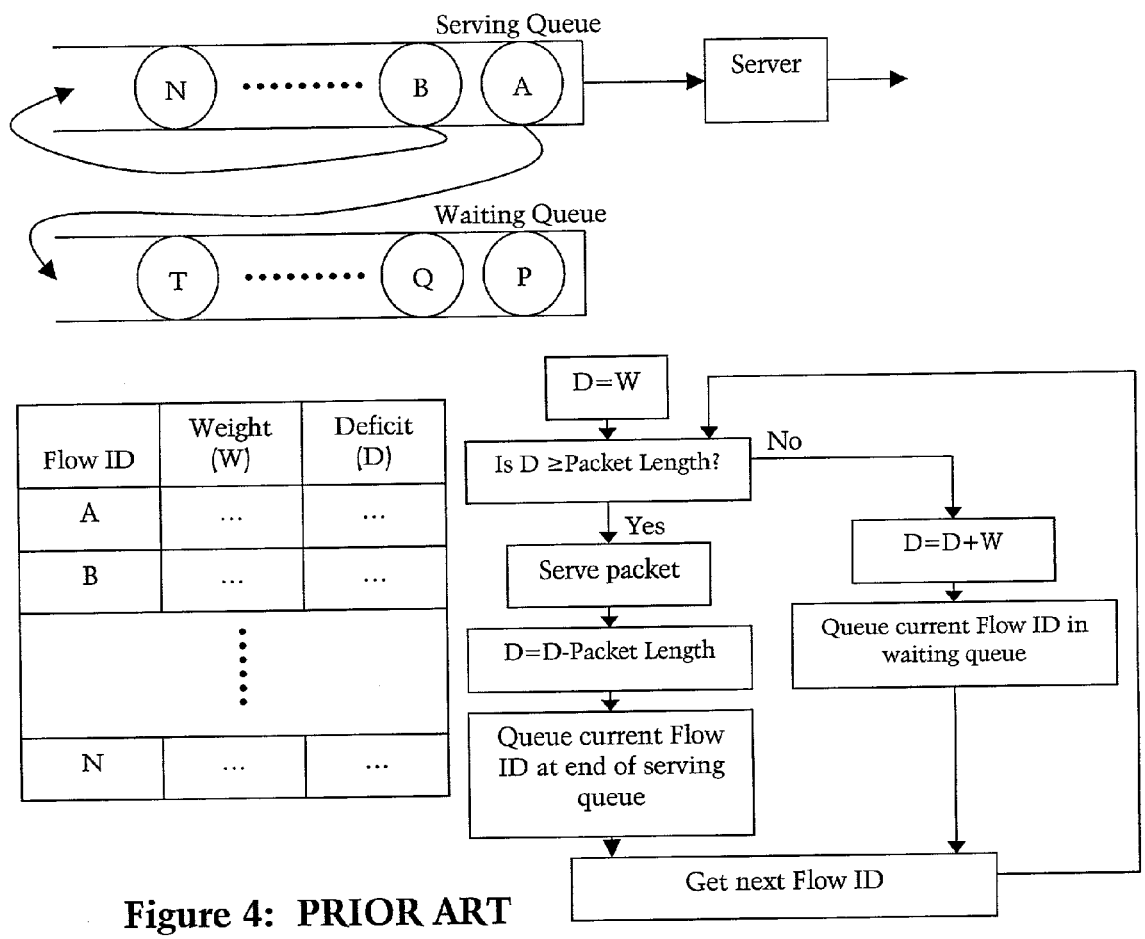
Figure 4: PRIOR ART

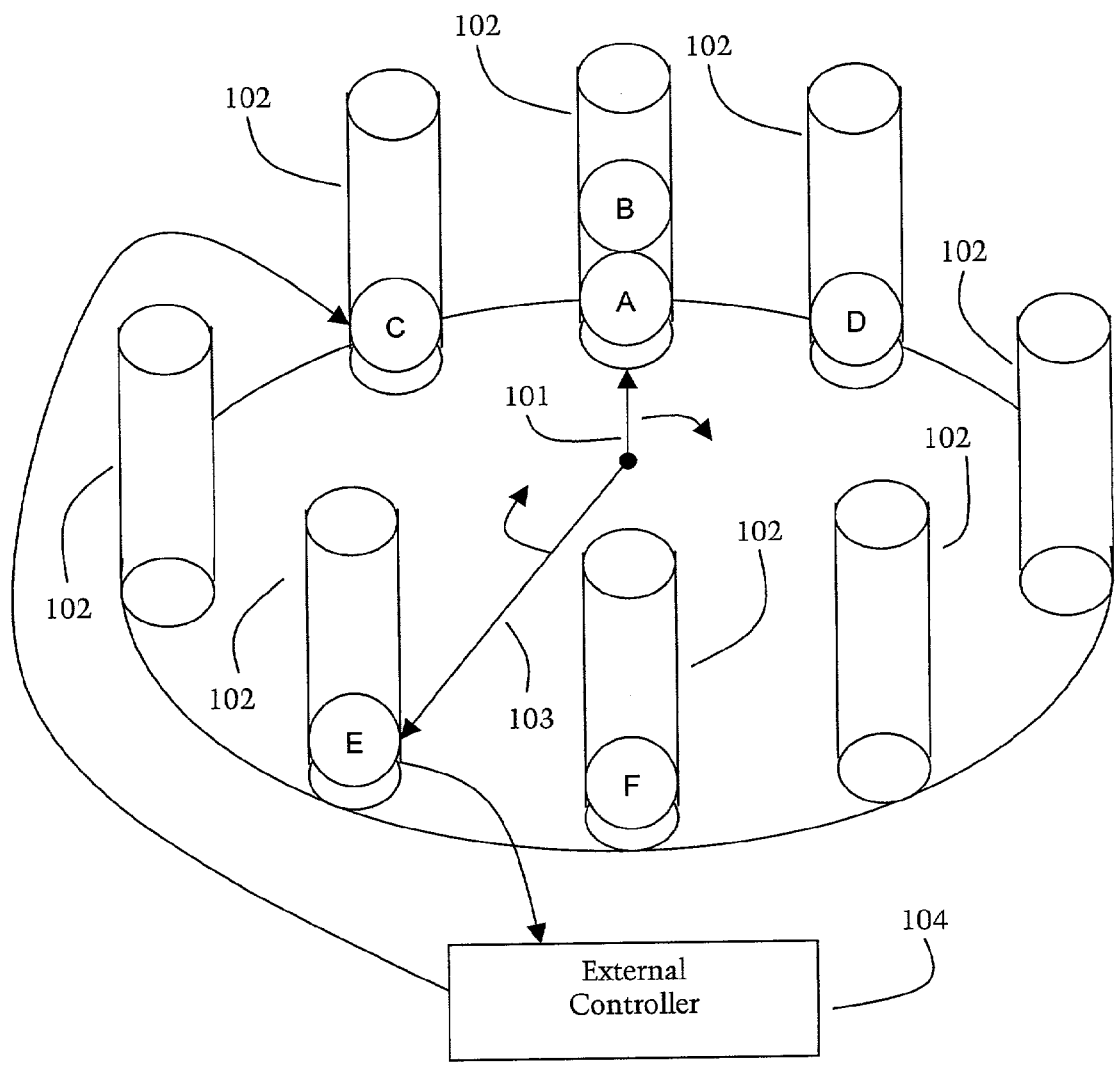
Figure 5: PRIOR ART

Table: Serving Value Bit Pattern and Scheduling Queue Selection

| N Bit Serving Value (S) | Selected Scheduling Queue |
|---|---|
| xxx...xxx1 | Q(N-1) |
| xxx...xx10 | Q(N-2) |
| xxx...x100 | Q(N-3) |
| ⋮ | ⋮ |
| x10...0000 | Q(1) |
| 100...0000 | Q(0) |

Figure 8

Table: Selection of Scheduling Queues According to S (4 Bit Example)

| Serving Value (S) | Selected Scheduling Queue |
|---|---|
| 0000 | ****(not used) |
| 0001 | Q(3) |
| 0010 | Q(2) |
| 0011 | Q(3) |
| 0100 | Q(1) |
| 0101 | Q(3) |
| 0110 | Q(2) |
| 0111 | Q(3) |
| 1000 | Q(0) |
| 1001 | Q(3) |
| 1010 | Q(2) |
| 1011 | Q(3) |
| 1100 | Q(1) |
| 1101 | Q(3) |
| 1110 | Q(2) |
| 1111 | Q(3) |

Figure 9

Table: Connection Weight Value (W) and Scheduling
Queues Eligible for Token Distribution According to W

| $W_3W_2W_1W_0$ | Eligible Scheduling Queues | Max Servings per Cycle |
|---|---|---|
| 0000 | None | 0 |
| 0001 | Q(0) | 1 |
| 0010 | Q(1) | 2 |
| 0011 | Q(1), Q(0) | 3 |
| 0100 | Q(2) | 4 |
| 0101 | Q(2), Q(0) | 5 |
| 0110 | Q(2), Q(1) | 6 |
| 0111 | Q(2), Q(1), Q(0) | 7 |
| 1000 | Q(3) | 8 |
| 1001 | Q(3), Q(0) | 9 |
| 1010 | Q(3), Q(1) | 10 |
| 1011 | Q(3), Q(1), Q(0) | 11 |
| 1100 | Q(3), Q(2) | 12 |
| 1101 | Q(3), Q(2), Q(0) | 13 |
| 1110 | Q(3), Q(2), Q(1) | 14 |
| 1111 | Q(3), Q(2), Q(1), Q(0) | 15 |

Figure 10

Table: Scheduling Queues Eligible for Selection as a Function of Subround Number

| Subround Number | Scheduling Queues Eligible to be Selected |
|---|---|
| 1 | Q(N-1), Q(N-2), ..., Q(0) |
| 2 | Q(N-2), Q(N-3), ..., Q(0) |
| ⋮ | ⋮ |
| N-1 | Q(1), Q(0) |
| N | Q(0) |

Table: Serving Values by Subround and
Scheduling Queue Selection (3 Bit Example)

| Serving Value (S) | Selected Scheduling Queue |
|---|---|
| 000 | ****(not used) |
| 001 | Q(2) |
| 010 | Q(1) |
| 011 | Q(2) |
| 100 | Q(0) |
| 101 | Q(2) |
| 110 | Q(1) |
| 111 | Q(2) |
| 010 | Q(1) |
| 100 | Q(0) |
| 110 | Q(1) |
| 100 | Q(0) |

Subround 1: rows 001–111
Subround 2: rows 010, 100, 110
Subround 3: row 100
Serving Cycle: all rows

Figure 16

METHOD AND APPARATUS FOR WFQ SCHEDULING USING A PLURALITY OF SCHEDULING QUEUES TO PROVIDE FAIRNESS, HIGH SCALABILITY, AND LOW COMPUTATION COMPLEXITY

TECHNICAL FIELD

The present invention relates to a scheduler which implements a scheduling algorithm for fixed length cells or variable length packets. The present invention provides a fair allocation of bandwidth among multiple connections based on each connection's weight, and can be scaled without any granularity restrictions. The scheduler can perform its computations in constant time, regardless of the number of connections it supports. Further, the scheduler can interleave packets from different connections to decrease the burstiness of the traffic.

BACKGROUND OF THE INVENTION

There are different types of applications in an integrated service packet network such as an Asynchronous Transfer Mode (ATM) network. Some applications, such as voice or real-time media stream, need to be transmitted with little delay and little delay jitter. Similarly, applications, such as remote log-in or on-line trading, can tolerate only small amounts of delay. Other applications, such as e-mail or FTP, can tolerate longer delays, and therefore do not need to be transmitted within a strict delay or delay jitter constraint. Because of the diverse range of acceptable delays for various applications, it is very important to support different levels of qualities of service (QoS) for these various applications. Also, it is important to allocate bandwidth among the connections in a fair manner so that a connection which is sending high rate or bursty traffic cannot occupy more bandwidth than it should be occupying. Thus, a scheduler should fairly allocate bandwidth among multiple connections according to their weights, so a connection sending traffic having an excessively high rate or bursty traffic will not adversely affect other connections.

In a system where a plurality of virtual connections (VCs) are competing to share a common resource (such as the same input port, output port, etc.), one way to control delay and fairly allocate that resource among the connections is to assign different weights to each VC and configure the system to serve the VCs according to their weights. Weight-based scheduling schemes have received a lot of attention, and many weight-based scheduling algorithms have been proposed, such as:

The General Processor Sharing (GPS) approach (See "A Generalized Processor Sharing Approach to Flow Control in Integrated Services Networks: The Single-Node Case," by Abhay K. Parekh and Robert G. Gallager, published in IEEE/ACM Transactions on Networking, Vol. 1, No. 3, June 1993, p. 344–357), The Weighted Fair Queuing (WFQ) approach (See the above-mentioned Parekh article), The Worst Case Weighted Fair Queuing ($WF^2Q$) Approach (See "$WF^2Q$: Worst-case Fair Weighted Fair Queuing," by J. C. Bennett and H. Zhang, published in Proceedings of IEEE INFOCOM '96, p. 120–128), The VirtualClock approach (See "VirtualClock: A New Traffic Control Algorithm for Packet Switching Networks," by L. Zhang, published in Proceedings of ACM SIGCOMM 1990, p. 19–29 and "Leap Forward Virtual Clock: A new Fair Queuing Scheme with Guaranteed Delays and Throughput Fairness," by Subhash Suir, G. Varghese and Cirish Chandranmenon, published on IEEE INFOCOM'97), The Self-Clocked Fair Queuing (SCFQ) approach (See "A Self-Clocked Fair Queuing Scheme for Broadband Applications," by S. J. Golestani, published in Proceedings of IEEE INFOCOM 1994, p. 636–646), The Delay Earliest Due Date (Delay-EDD) and Jitter Earliest Due Date (Jitter-EDD) approaches (See "Comparison of Rate-Based Service Disciplines," by H. Zhang and S. Keshav, published in Proceedings of ACM SIGCOMM 1991, p. 113–121), and The Head-of-the-Line Earliest Due Date (HOL-EDD) approach (See "HOL-EDD: A Flexible Service Scheduling Scheme for ATM Networks," by M. Vishnu and J. W. Mark, published in Proceedings of IEEE INFOCOM 1996, p. 647–654).

The entire disclosures of each of the above-cited publications are incorporated herein by reference.

The commonality of these algorithms is that each one is based on time stamps that are assigned to each incoming packet or to each packet queue. The packets are then sent according to a time stamp sorting result.

While the GPS approach is very flexible and provides perfect fairness (which thereby would give users widely different performance guarantees), GPS is an idealized approach which is not practical to implement because GPS assumes that the scheduler can serve multiple sessions simultaneously, and further assumes that packet traffic is infinitely divisible. The WFQ approach (which is also called packet-by-packet GPS, or PGPS) and the $WF^2Q$ approach are packet-by-packet disciplines which closely approximate the GPS approach. Both WFQ and $WF^2Q$ have attractive characteristics with respect to delay and fairness, but are impractical to implement because of the intensive computations that these approaches require. SCFQ and VirtualClock reduce the computation complexity of WFQ and $WF^2Q$ using an approximation algorithm to simplify the calculation of the virtual time. Because these two algorithms use the internally generated virtual time to reflect the progress of work in the system (rather than using virtual time generated in the hypothetical GPS system), the performance of these two algorithms is not as good as WFQ and $WF^2Q$. Therefore, a need has existed within the art for a scheduling algorithm that can provide high performance with minimal computation complexity.

A major problem with these time stamp-based algorithms is the computation cost. FIG. 1 shows the basic configuration used in implementing time stamp-based algorithms. As packets arrive, a time stamp is attached thereto. Then, the packets are stored in the buffer. The algorithm needs to calculate virtual time for each packet or for each connection. Then, the algorithm requires that each packet or connection be sorted according to their time stamps in order to serve the packet or connection with the minimum time stamp. If no approximation method is employed, the computation cost for the time stamp-based algorithm is $0(\log_2 N)$, where N is the number of backlogged queues. Because typical systems have thousands of VCs multiplexed into one link, the resultant high computation cost makes these algorithms impractical to implement in a high-speed system.

Another traditional scheduling algorithm that is often implemented is the Weighted Round Robin (WRR) approach. FIG. 2(a) depicts a conventional WRR algorithm. The backlogged connections 100 (labeled A–F) are connected in a ring. As can be seen, each connection has a weight, W, assigned thereto. A connection with weight 2 will get served twice as often as a connection with weight 1. In the example of FIG. 2(a), the scheduler can serve connection A three times (e.g. dequeue 3 packets from connection A) before moving on to connection B, which gets served twice. Thereafter, connections C, D, E, and F get served once, three times, once, and twice respectively as the scheduler moves from connection to connection. With this conventional WRR algorithm, a high weight connection may block a low weight connection, thereby increasing the traffic delay.

An improved WRR algorithm was proposed in "Weighted Round-Robin Cell Multiplexing in a General-Purpose ATM Switch Chip," authored by M. Katavenis et al. and published in IEEE J. Select Areas, Commun., Vol. 9, No. 8, p. 1265–1279, October 1991, the entire disclosure of which is incorporated herein by reference.

FIG. 2(b) depicts the improved WRR algorithm. Rather than successively serving each connection by a number of packets equal to that connection's weight before moving on to the next connection, the improved WRR algorithm will move to the next connection after serving a previous connection by one packet. To serve the connections according to their weights, multiple "trips" around the connections may have to be made. As shown in FIG. 2(b), connection A (whose weight is 3) will get served by one packet. After such service, connections A's residual weight will be decremented by one. Next connection B (whose weight is 2) will get served by one packet, and then its residual weight will be decremented by one. This pattern will repeat itself as the scheduler moves from connection to connection, and makes a number of "roundtrips" equal to the highest weight assigned to a connection. Service to a given connection will occur in a roundtrip so long as that connection's residual weight is greater than zero. Once all connections have a residual weight equal to zero, the serving cycle will be reset with each connection being accorded its maximum weight. In FIG. 2(b), there will be 3 roundtrips. In the first roundtrip, the serving order will be ABCDEF. In the second roundtrip, the serving order will be ABDF. In the third roundtrip, the serving order will be AD. Thus, the overall serving pattern for a full serving cycle will be ABCDEF–ABDFAD.

The improved WRR algorithm serves connections more evenly in time, but still maintains the same serving frequencies. This algorithm can be easily implemented in hardware, and the computation cost for the serving position only has $0(1)$ of complexity. However, because it takes $0(\log_2 N)$ time to search through the binary tree to find the next VC entry to serve, this scheme is not scalable to a high speed system. Also, the round robin techniques of FIGS. 2(a) and 2(b) are unable to guarantee fairness among different flows if variable length packets are served because the scheduler fails to take into account packet length when serving packets.

The Deficit Round Robin (DRR) technique shown in FIG. 3 addresses the unfairness using a deficit counter. As shown in FIG. 3, a weight W is assigned to each FlowID. Also, a deficit counter (D) is maintained for each FlowID. Initially, D is set equal to W. When a given FlowID is selected for service, the scheduler checks whether the D associated with that FlowID is larger than or equal to the length of the packet at the head of the FlowID's queue. If D is larger than or equal to that packet's length, the packet is served. Thereafter D is decremented by the packet's length, and the scheduler checks the next packet in FlowID's queue. As long as the packet at the head of FlowID has a length less than or equal to D, FlowID will continue to be served. If D drops below the packet's length, then D is incremented by W and the scheduler requeues the current FlowID at the end of the serving queue before proceeding to the next FlowID. The DRR technique shown in FIG. 3 can guarantee fairness in terms of throughput, but it allows burstiness, especially for FlowIDs having a large weight.

U.S. Pat. No. 6,101,193 issued to Ohba, the entire disclosure of which is incorporated herein by reference, discloses a modified version of DRR that seeks to improve short-term fairness. FIG. 4 generally discloses the modified DRR technique of the '193 patent. As shown in FIG. 4, the scheduler maintain two queues: a serving queue and a waiting queue. Backlogged flows are initially placed in the serving queue. The scheduler selects each flow in round robin fashion. The packet at the head of the selected flow is served if the flow's D value is not less than the length of the packet at the head of the flow. When a packet from a flow is served, that flow's D value is decremented by the length of served packet. Thereafter, that flow is moved to the end of the serving queue. If the packet at the head of the selected flow has a length greater than D, then that flow's D value is incremented by W and the flow is moved to the end of the waiting queue. No packet is served at this time. Once the serving queue becomes empty, the scheduler treats the waiting queue as the serving queue and the serving queue as the waiting queue, and the process continues. This modified DRR scheme provides fairness through interleaved service, but it requires the scheduler to constantly check whether a flow's allocated weight has been exhausted before deciding whether to serve a packet.

Time-Wheel is another scheduling approach used in ATM systems. As shown in FIG. 5, several queues 102 are organized in a round topology. Each queue 102 contains zero or more backlogged connections (denoted as A, B, C, D, F, and G). Two time pointers, the time pointer 101 and transmission pointer 103 are employed to control the scheduler. The time pointer 101 moves clockwise from one queue to the next for each cell time. All connections behind time pointer 101 are eligible to be served. The transmission pointer 103, which also moves clockwise, either lags or steps together with time pointer 101. The connections in the queues pointed to by the transmission pointer 103 get served one by one. External controller 104 places the connections into one of the queues.

U.S. Pat. No. 6,041,059 issued to Joffe et al., the entire disclosure of which is incorporated herein by reference, describes an improved Time-Wheel algorithm. The computation complexity of the Time-Wheel algorithm is independent of the number of VCs, and the scheduler can precisely pace the assigned bandwidth described in [i, m] (i cells and m cell time). However, several limitations hinder this approach. The first limitation being that the Time-Wheel scheme cannot serve more than m/i VCs. The second limitation being that fairness cannot be guaranteed when the bandwidth is oversubscribed. Therefore, the Time-Wheel approach also does not provide a scheduling algorithm suitable for high speed systems.

Because WFQ has several analytically attractive characteristics relating to delay and fairness, many simplified WFQ algorithms have been implemented. For example, the article, "A Queue-Length Based Weighted Fair Queuing Algorithm in ATM Networks," authored by Yoshihiro Ohba, and published in Proceedings of INFOCOM '97, 16th Annual Joint Conference of IEEE Computer & Communications Societies, the entire disclosure of which is incorporated herein by reference, discloses a Queue-Length Based WFQ algorithm (QLWFQ) which maintains one common scheduling queue to hold credits for the VCs.

FIG. 6 depicts this QLWFQ scheme. One scheduling queue 108 queues credits for the connection queues 106. Each connection queue 106 has a weight assigned thereto. Each connection queue also has a length measured by the number of cells stored therein. By virtue of having a credit(j) queued in the scheduling queue 108, connection queue(j) will have a cell dequeued therefrom when credit(j) reaches the head of scheduling queue 108. Thus, each cell time, the scheduler takes the first credit from scheduling queue 108, and serves one cell from the connection queue corresponding to that credit.

Credits are updated in two ways. First, when an incoming cell arrives, a connection(i) is determined for that cell. A credit for connection(i) is added to the scheduling queue 108 if the length of connection queue(i) is less than or equal to the weight assigned to connection queue(i). Second, when an outgoing cell is taken from connection queue(j), the credit for connection queue(j) that is at the head of the scheduling queue is removed. If the length of connection queue(j) after dequeuing a cell therefrom is greater than or equal to the weight assigned to connection queue(j), then a credit for connection queue(j) is added to the back of the scheduling queue.

While the QLWFQ scheme reduces the computation complexity to 0(1), it may cause the head-of-line blocking due to bursty traffic, wherein a large number of credits for the same connection queue are added continuously to the scheduling queue. The other limitation of the QLWFQ scheme is that the scheduling queue must hold credits for all backlogged connections. For each connection, a number of credits up to the value of that connection's weight may be stored in the scheduling queue. When the weight granularity is doubled, the memory to hold the credits for the scheduling queue is doubled. Therefore, QLWFQ is not sufficiently flexible to support a wide range of granularities.

U.S. Pat. No. 6,014,367, issued to Joffe, the entire disclosure of which is incorporated herein by reference, discloses a method that can provide a minimum service rate to each VC on a small selected time scale, with no limitation on the number of VCs it can support. There are two kinds of queues in the scheme, a waiting queue and a serving queue. The waiting queue becomes the serving queue when the present serving queue is empty. Both queues are FIFOs. The connections buffered in the serving queue are served one by one, and the scheduler decides on the basis of credits whether the VCs should reenter the serving queue or be moved to the waiting queue. The credit value is increased by the weight when the connection is moved to the waiting queue, and is decreased when the connection gets served by the scheduler. Under this scheme, the interval time between repeat service to a connection does not depend on its weight, but depends on the backlogged connections in the serving queue. In the high speed ATM network, where there are thousands of connections sharing one link, the latency under this scheme is quite high.

Another rate-based WFQ scheme is disclosed in U.S. Pat. No. 6,130,878 issued to Charny, the entire disclosure of which is incorporated herein by reference. This scheme, which operates in the frequency domain, maintains a counter called "relative error" for each VC. Each cell time, the scheduler searches for the VC with the largest relative error, and serves that VC. Because this method involves sorting, there is a limitation on the number of VCs that can be supported in a high-speed ATM switch.

Yet another WFQ algorithm is disclosed by Chen et al. in Chen et al., "Design of a Weighted Fair Queuing Cell Scheduler for ATM Networks", Proceedings of Globecom 1998, the disclosure of which is incorporated herein by reference. However, under this scheme for scheduling cells, each connection can only be assigned a weight that is a power of two. As such, the granularity of service provided to the connections is poor.

Therefore, a need exists within the art for a scheduler which can fairly allocate bandwidth among numerous connections without an excessive computation cost or a limit on how many connections the scheduler can support.

SUMMARY OF THE INVENTION

To satisfy this need and to solve the above-described shortcomings in the art, disclosed herein is a WFQ scheduler that is suitable for use with high-speed systems. The computation complexity is O(1), does not depend upon the number of VCs supported by the scheduler, and can be finished in constant time. Each VC has a connection queue in which to store incoming objects, and the present invention allocates bandwidth among the different connections based on their weights without any granularity restrictions. Also, because of the present invention's technique of interleaving service to the various connections, the present invention represents an improvement in latency and fairness with respect to the prior art. Because of the interleaved service among the connections, burstiness is avoided, and traffic is spread more evenly in time. Furthermore, the scheduler can be configured to dynamically adjust the step size of its serving counter according to the traffic received by the scheduler, thereby maximizing efficiency.

Accordingly, disclosed herein is a method of scheduling access to a common resource for a plurality of objects queued in a plurality of connection queues during a plurality of serving cycles, each serving cycle comprising a plurality of serving values, the method comprising:

maintaining a serving counter configured to cycle through the serving values of the serving cycle;

maintaining a scheduling queue set, the scheduling queue set comprising a plurality N of scheduling queues Q(N−1) through Q(0);

assigning a scheduling weight to each scheduling queue Q(k) of the scheduling queue set;

associating each serving value with a scheduling queue in a manner proportional to the scheduling weights assigned to the scheduling queues;

for each connection queue CQ(i), (1) assigning a connection weight $W^i$ thereto that is representative of a desired amount of service to be allotted to connection queue CQ(i) during each serving cycle;

for each CQ(i) that is backlogged, maintaining a token T(i) associated therewith;

storing each T(i) in a queue of the scheduling queue set at least partially as a function of (i) $W^i$, and (ii) the scheduling weights assigned to the scheduling queues;

for each serving value S of the serving counter, (1) selecting the scheduling queue associated therewith, and (2) for each T(i) stored in the selected scheduling queue, (i) serving CQ(i) by dequeuing an object therefrom and providing the dequeued object to the common resource.

A connection queue becomes backlogged when a threshold number of objects are queued therein. Preferably, this threshold number is one; in which case, a backlogged connection queue is the equivalent of a nonempty connection queue.

Preferably, the serving counter is an N bit binary serving counter, and each serving value S is an N bit value $S=S_{N-1}S_{N-2}\ldots S_0$. To associate each serving value with a scheduling queue in a manner proportional to the scheduling weights assigned to the scheduling queues, a scheduling queue Q(k) is associated with a serving value S if $S_k$ is the least significant bit of S that equals a predetermined number. Preferably, this predetermined number is one. Thus, for a scheduling queue Q(k) having a scheduling weight of $2^k$ assigned thereto, there will be $2^k$ serving values associated therewith. Each serving value S associated with Q(k) will possess a unique bit pattern wherein bit $S_k$ of each serving value S is the least significant bit of S equal to the predetermined number. By associating serving values with scheduling queues in this manner, a fair system of interleaved service can be provided to the connection queues.

Further, each connection weight $W^i$ is preferably an N bit value $W^i = W^i_{N-1} W^i_{N-2} \ldots W^i_0$. As stated, the present invention moves each token T(i) among the scheduling queues of the scheduling queue set at least partially as a function of both $W^i$ and the scheduling weights assigned to the scheduling queues. Preferably, a token T(i) may only be stored in a scheduling queue eligible to store that token. Scheduling queue eligibility for each token T(i) is also at least partially a function of $W^i$ and the scheduling weights assigned to the scheduling queues. Preferably, a token is eligible to be stored in scheduling queue Q(k) for each k where bit $W_k^i$ of $W^i$ equals a predetermined number. The predetermined number is preferably one.

To implement arbitrary weight for the connections between 1 and $2^N-1$, a single token is preferably maintained for each backlogged connection queue and that single token is preferably moved among eligible scheduling queues to emulate multiple tokens. It is preferred that a single token be used for each backlogged connection because difficulty arises when managing multiple tokens for a single connection. For example, when a connection queue CQ(i) is no longer backlogged, it is much simpler to remove a single token for CQ(i) from the one of scheduling queues than it would be to remove multiple tokens from several scheduling queues. However, the use of a single token for each backlogged connection results in the need to develop a viable working plan for moving tokens for backlogged connections among scheduling queues such that backlogged connections receive the full amount of service made available thereto.

The specific token storage scheme employed by the present invention will depend upon the objects queued in the connection queues. To ensure that a backlogged connection queue receives the full amount of service available thereto (as determined from $W^i$) when the objects are cells (which have a fixed length), the present invention preferably handles each token T(i) by (1) initially storing T(i) in the scheduling queue having the highest scheduling weight of each scheduling queue that is eligible to store T(i) (which will be Q(k) where bit $W_k^i$ of $W^i$ is the most significant bit of $W_k^i$ that equals the predetermined number), and (2) when CQ(i) is served and remains backlogged after service thereto, redistributing T(i) to the scheduling queue eligible to store T(i) that is next to be selected of each scheduling queue eligible to store T(i).

When the objects scheduled by the present invention are variable length packets having a length comprised of one or more cells, the present invention also maintains a residual weight value $RW^i$ for each connection queue CQ(i). Each $RW^i$ value is a running representation of how much of the desired service amount remains available to CQ(i) during the current serving cycle. Presuming that CQ(i) is backlogged, $RW^i$ will vary throughout the serving cycle. Token storage for each T(i) in the variable length packet scheduling embodiment further depends upon $RW^i$.

Each $RW^i$ value is initially set equal to $W^i$ and is adjusted downward when a packet is served from CQ(i), the downward adjustment being made in a manner proportional to the length of the served packet. If a $RW^i$ value ever becomes negative during a given serving cycle, CQ(i) is no longer eligible to be served during the remainder of that serving cycle. Once service to a connection queue is complete for a serving cycle, $RW^i$ is adjusted upward by $W^i$. Thus, any over-service that a connection queue receives during a serving cycle (which may result when a relatively long packet is served), is carried over to the next serving cycle to thereby keep service to each connection queue CQ(i) within the bounds set by $W^i$.

As an example, if $RW^i$ is 2 and $W^i$ is 4, and a packet having a length of 3 cells is served from CQ(i), then the adjusted $RW^i$ value becomes −1. In such a case, service to CQ(i) is complete for the remainder of the current serving cycle and $RW^i$ is increased by $W^i$ to a new value of 3. Thus, during the next serving cycle, CQ(i) is allotted service in the amount of three cells to account for the fact that it received service in the amount of 5 cells during the previous serving cycle. The present invention seeks to limit CQ(i) to 4 cells per serving cycle (its $W^i$ value) on average throughout a plurality of serving cycles.

Preferably, in the variable length packet embodiment, the scheduling queue set comprises an active scheduling queue subset and an inactive scheduling queue subset. Each scheduling queue subset comprising a plurality N of scheduling queues Q(N−1) through Q(0) and a collection queue. Each serving cycle, the scheduler toggles which subset is active and which subset is inactive. Each token T(i) associated with a connection queue that is no longer eligible to be served during the current serving cycle is preferably moved to a queue of the inactive subset. Each token T(i) associated with a connection queue that remains eligible to be served during the current serving cycle is preferably moved to a scheduling queue of the scheduling queue set that is eligible to store T(i) and that will be selected the soonest of each scheduling queue eligible to store T(i).

Further, in the variable length packet scheduling embodiment, each serving cycle preferably comprises a plurality N of subrounds. Each subround SR comprises at least one serving value. During a given subround SR, the step size between successive serving values will be $2^{SR-1}$. As a result of step size being a function of subround, each successive subround will result in a decrease in the number of scheduling queues eligible to be selected. For example, when N=4, Q(3) will be selected each odd serving value during subround 1. However, once S wraps around and the subround increases to subround 2, the serving values will be 0010, 0100, 0110, 1000, 1010, 1100, and 1110—none of which result in the selection of Q(3). To allow each CQ(i) to receive the full amount of service allotted thereto, the eligibility of scheduling queues to store tokens further depends upon subround number when the serving cycle includes subrounds.

Another feature of the present invention which may be implemented in either the fixed length case or the variable length case is the ability to dynamically update the serving value of the serving counter to avoid the waste in bandwidth that occurs when empty scheduling queues are selected. If the scheduler allows the serving counter to blindly update its serving value in a single step incremental fashion ($S_{NEXT} = S_{CURRENT} + 1$), then bandwidth may be wasted as the serving counter takes on a serving value specifying the selection of a scheduling queue having no tokens stored therein. When a scheduling queue is empty, it is preferable that the serving counter skip a serving value that is associated with an empty scheduling queue and move quickly to a serving value that is associated with a nonempty scheduling queue. Toward this end, the serving counter may jump from a current serving value to a next serving value such that a serving value associated with an empty scheduling queue is skipped.

As shown in FIG. 10 below, the granularity of connection weights supported by the scheduler of the present invention will be $2^N-1$. To effectively double the number of connection weights supported by the scheduler, few modifications need to be made (the addition of a single scheduling queue). When N=3, there will be 3 scheduling queues, and the connection weight values will be N bits long. The number of different levels of service (or connection weights) assigned to each connection queue will be 7 (or $2^3-1$). By adding a single scheduling queue, N will increase from 3 to 4, meaning that each connection weight value will go from being 3 bits long to 4 bits long, and the number of different connection weights that can be supported by the scheduler will jump from 7 to 15 (or $2^4-1$). This feature of the present invention allows the scheduler to be scaled to support a large number of connection weights (a wide range of QoS levels) with a minimal amount of modification, and without increasing the computational complexity.

It is thus an object of the present invention to provide a scheduler which can determine which connection queue should be served using only a minimal number of calculations. Because the calculations made by the present invention involves simple binary arithmetic, the scheduler is easily implementable in hardware. Also, the calculations made by the present invention can be finished in constant time, independent of the number of connection queues or scheduling queues supported by the scheduler.

It is a further object of the present invention to decrease the burstiness of traffic and improve latency and fairness performance by interleaving traffic from different connections. This fair allocation of bandwidth is cost-efficient and provides a finer granularity of fairness in scheduling traffic than conventional methods. Further, the bandwidth can be fairly allocated among the VCs based on their weights in any condition, whether the bandwidth is oversubscribed or undersubscribed.

It is a further object of the present invention to provide a highly scalable scheduler which can be scaled to support large numbers of connection weights without increasing the computation complexity and without requiring large modifications to the scheduler. By simply increasing the number of scheduling queues by one, a person can effectively double the number of connection weights supported by the scheduler.

It is yet a further object of the present invention to efficiently serve backlogged connection queues by dynamically adjusting the step size of the serving counter in accordance with the occupancy of each scheduling queue.

These and other features and advantages of the present invention will be in part apparent, and in part pointed out, hereinafter.

BRIEF DESCRIPTION OF THE DRAWINGS

FIG. 1 shows a conceptual model of a time stamp-based scheduling algorithm;

FIGS. 2(*a*) and 2(*b*) show examples of a Weighted Round Robin (WRR) scheduling algorithm;

FIG. 3 shows an example of a deficit round robin (DRR) scheduling algorithm;

FIG. 4 shows an example of a modified DRR scheduling algorithm;

FIG. 5 shows an example of a conventional Time-Wheel scheduling algorithm;

FIG. 6 shows an example of a Queue Length-Based WFQ (QLWFQ) scheduling algorithm;

FIG. 8 is a table showing how scheduling queues are selected as a function of the N bit serving value;

FIG. 9 is a table showing a 4 bit example of scheduling queue selection as a function of serving value;

FIG. 10 is a table showing a 4 bit example of connection weights, eligible scheduling queues for token storage as a function of connection weight, and maximum servings per cycle as a function of connection weight;

FIG. 16 is a table showing a 3 bit example of serving values and scheduling queue selection during a given serving cycle for the case of scheduling variable length packets;

DETAILED DESCRIPTION OF THE PREFERRED EMBODIMENT

A. Overview: Scheduler for Cells

Figure 7:
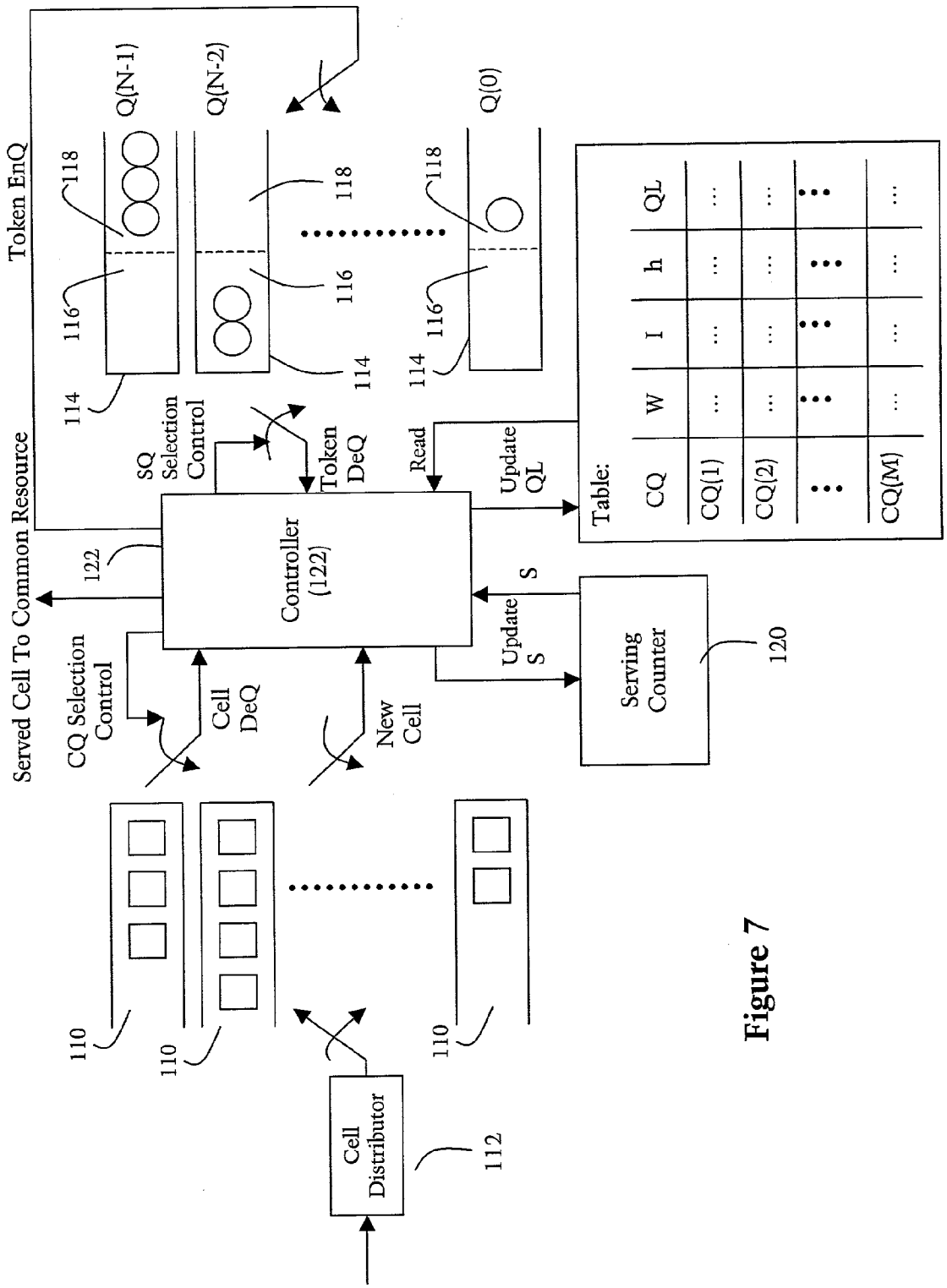
FIG. 7 is an overview of the fixed length packet scheduler of the present invention.

FIG. 7 shows the basic connection queue and scheduling queue structure of the cell scheduler of the present invention. Each cell has a fixed length such as the cells of ATM traffic. As can be seen in FIG. 7, there are a plurality of connection queues 110. Each connection queue 110 is associated with a different connection, and incoming cells are stored therein by the cell distributor 112 on the basis of connection information contained within the cells. That is, if an incoming cell has information contained therein that specifies it should be passed through connection A, then the cell distributor 112 will buffer that cell in the connection queue associated with connection A.

The scheduler of the present invention also has a scheduling queue set comprising a plurality of scheduling queues 114, labeled Q(N−1) through Q(0). Each scheduling queue Q(K) has an assigned scheduling weight of $2^K$. The value of N can be chosen depending upon the weight granularity and maximum weight that one wants the scheduler to support. In the preferred embodiment, wherein there are N scheduling queues, the scheduler can support connection weights ranging from 1 to $2^N-1$. Each scheduling queue 114 stores tokens (tokens are denoted as the circles resident in the scheduling queues 114 in FIG. 7) that are associated with particular connection queues. Each scheduling queue 114 will have a waiting pool 118 and a mature pool 116, which may be implemented as FIFOs. Tokens are initially stored in the waiting pools 118, and are transferred to the mature pools 116 upon selection of the scheduling queue. Preferably, the scheduling queues 114 only store tokens for backlogged connection queues. A connection queue becomes backlogged when a threshold number of cells are stored therein. In the preferred embodiment, where this threshold number is one, a backlogged connection queue is the equivalent of a non-empty connection queue. By storing only tokens for backlogged connection queues, the scheduler can avoid the wasteful situation of serving an empty connection queue.

A connection queue is serviced by the scheduler when the token associated therewith is dequeued from the scheduling queue in which it is stored. The selection of scheduling queues is done according to the serving value of a serving counter 120. Serving counter 120 maintains an N bit serving value. Each scheduling queue 114 is associated with a unique bit pattern of the serving value such that the serving values are associated with the scheduling queues in a manner proportional to the scheduling weights assigned thereto. Accordingly, depending upon which bit pattern is present in the serving value, the controller 122 can select the appropriate scheduling queue. The scheduling weight of a scheduling queue is then representative of how common that scheduling queue's bit pattern is within the serving value cycle. Preferably, each scheduling queue is selected according to the bit pattern of the serving value as follows: Q(N−1−a) will be selected if $S_a$ is the least significant bit of $S_{N-1}S_{N-2}\ldots S_1S_0$ equal to the predetermined value of 1. The application of this rule is shown in FIG. 8 (as well as FIG. 9). Essentially, each scheduling queue is associated with a bit in the serving value and will be selected whenever that bit is the least significant bit in the serving value equal to a predetermined value (preferably 1). In FIG. 8, the each "x" represents a don't care bit value.

When a scheduling queue 114 is selected, all tokens stored in the waiting pool 118 of that scheduling queue are moved to the mature pool 116 of that scheduling queue. Each connection queue associated with a token stored in the mature pool 116 of the selected scheduling queue will then be served. Service to a connection queue comprises providing a cell stored in that connection queue (preferably only one) to the common resource. Further, it is preferable that each connection queue be served by the same number of cells when being served.

The controller 122 is responsible for controlling the main scheduling operations of the scheduler. As will be explained in more detail with reference to FIGS. 11 and 12, the main tasks of controller 122 are as follows:

selecting a scheduling queue according to the serving value of the serving counter 120;

generating new tokens for connection queues that have become backlogged;

initially distributing each new token T(i) into the waiting pool of the scheduling queue associated with the most significant bit in the connection weight value $W^i$ assigned to CQ(i) that is equal to 1 (as explained below in connection with the formula for $h^i$);

serving each CQ identified by a token stored in the selected scheduling queue;

for each CQ being served, providing a cell therefrom to the common resource;

redistributing the tokens stored in the selected scheduling queue upon completion of service to the CQs with tokens stored in the selected scheduling queue; and updating the serving value such that the selection of an empty scheduling queue will be avoided (as explained below in connection with the formula for $S_{NEXT}$).

The controller 122 achieves fair allocation of bandwidth among the connections by distributing tokens to the appropriate scheduling queues as a function of the connection weight values assigned to the connection queues. As stated, each connection queue CQ(i) has an N bit connection weight value $W^i=W_{N-1}W_{N-2}\ldots W_0$ assigned thereto. Derived from each $W^i$ will be an incremental value $I^i$, and a value $h^i$, as will be explained in more detail below. These parameters ($W^i$, $I^i$, and $h^i$) can be stored in a table 124 (however, if desired the controller can calculate these values on the fly), and are used in determining how tokens should be stored in the scheduling queues.

A different scheduling queue will be associated with each bit in $W^i$. Preferably, the scheduling queue having the highest scheduling weight will be associated with the most significant bit in $W^i$, the scheduling queue having the second-highest scheduling weight will be associated with the second-most significant bit in $W^i$, and so on, down to the least significant bit of $W^i$, which will be associated with the scheduling queue having the lowest scheduling weight. From this correlation, the eligible scheduling queues into which a token T(i) associated with connection queue CQ(i) may be stored are those scheduling queues associated with a bit in $W^i$ that is equal to a predetermined value (preferably 1). That is, Q(k) is eligible to store T(i), wherein k is each k where bit $W_K^i$ of $W^i$ equals one. FIGS. 9 and 10 show the inter-relationship among serving values, selected scheduling queues, connection weight values, and eligible scheduling queues for token placement.

Because of the interleaved pattern of scheduling queue selection shown in FIG. 9, wherein Q(3) gets served every other serving value, Q(2) gets served every fourth serving value, Q(1) gets served every eighth serving value, and Q(0) gets served every sixteenth serving value, the scheduler of the present invention improves latency and fairness performance. Burstiness (where a single connection monopolizes access to the common resource for an extended period of time) can therefore be avoided due to the interleaved selection of scheduling queues.

A complete serving cycle for the scheduler in the case of scheduling cells is the progression of serving values from 0001 to 1111, which will be 15 values in the 4 bit example (S=0000 is preferably not used). As can be determined from counting how many times each scheduling queue appears as the selected scheduling queue, the scheduling weight of Q(3) is 8, the scheduling weight of Q(2) is 4, the scheduling weight of Q(1) is 2, and the scheduling weight of Q(0) is 1. For the connection weight value $W^i=W_3W_2W_1W_0$, Q(3) will be associated with $W_3$, Q(2) will be associated with $W_2$, Q(1) will be associated with $W_1$, and Q(0) will be associated with $W_0$.

In FIG. 10, it can be seen how the connection weight assigned to a connection queue will affect how often that connection queue is served during a cycle. In heavy traffic conditions, where a connection queue remains backlogged for an entire cycle, its token will remain in the scheduling queues for the entire cycle. At any given time, a token T(i) for a backlogged connection queue CQ(i) can be stored in any of its eligible scheduling queues. As stated above, the eligible scheduling queues for T(i) are found by determining which scheduling queues are associated with bits in $W_i$ that equal a predetermined value (preferably 1). That is, a token T(i) for CQ(i) is eligible to be stored in any Q(j) where $W^i_j=1$.

Thus, as can be seen from FIG. 10, when $W^i=1001$, the eligible scheduling queues for storing T(i) are Q(3) (because $W_3=1$) and Q(0) (because $W_0=1$). Because of the token distribution method explained in more detail below, once token T(i) is initially stored in a scheduling queue, it will always be stored in the eligible scheduling queue that will be selected the soonest. For the example where $W^i=1001$, the maximum number of servings in a cycle for CQ(i) will be 9. The maximum serving number assumes that CQ(i) remains backlogged for an entire cycle, and that the token distribution method will optimally move T(i) between Q(3) and Q(0) to reap the maximum amount of service. Because Q(3) will be selected 8 times per cycle and Q(0) once per cycle (as seen in Table 2), CQ(i) will be served 9 times per cycle as T(i) is optimally moved between Q(3) and Q(0). Thus, from FIG. 10, it should quickly be discernable that the following expression represents the maximum number of servings for CQ(i) in a serving cycle:

$$\text{MaxServings}_{CQ(i)} = W^i_{N-1}2^{N-1} + W^i_{N-2}2^{N-2} + \ldots + W^i_1 2^1 + W^i_0 2^0$$

From FIGS. 9 and 10, the high scalability of the scheduler of the present invention can also be seen. Simply by adding another scheduling queue (and thereby increasing N by one), the maximum weight that the scheduler can support is doubled. For example, in the examples of FIGS. 9 and 10, the number of scheduling queues is 4 (N=4), and the number of actual connection weights supported is 15 (the connection weight value of 0000 translates to no servings per cycle and can thus be disregarded). If the number of scheduling queues is increased from 4 to 5 (N=5), it can easily be seen that the number of connection weights supported will increase from 15 to 31. However, the computation complexity will remain the same, with only the length of the cycle increasing. By increasing the maximum weight supported by the scheduler, finer granularity of service can be provided to the connections. A mathematical analysis of how present invention achieves WFQ scheduling is disclosed in the paper entitled "A Highly Scalable Dynamic Binary Based WFQ Scheduler". This paper, which is authored by the inventors herein, is included as Appendix A.

B. The Scheduling Algorithm for Cells

Figure 11:
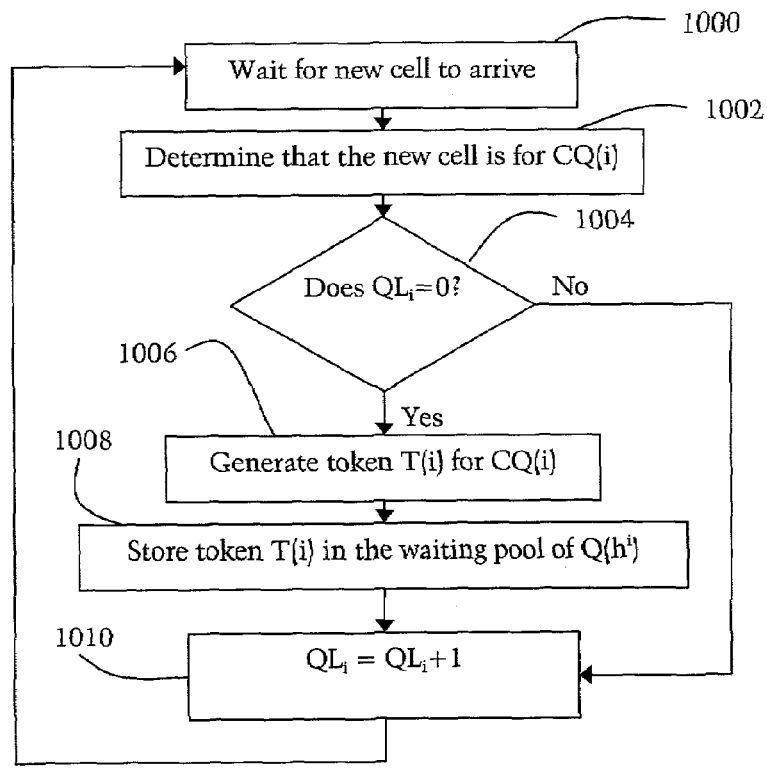
FIG. 11 is a flowchart depicting how the controller creates and initially stores tokens in the case of scheduling fixed length packets.

FIG. 11 is a flowchart depicting how the controller 122 creates new tokens for the connection queues and then stores those new tokens in the scheduling queues. At step 1000, the controller waits for a new cell to arrive. At step 1002, the controller determines which connection queue CQ(i) is to receive the cell. This determination can be made in response to a signal provided by the cell distributor 112, some status indicator received from CQ(i), or a status check performed by the controller on CQ(i), or any other means of determining when a new cell has been stored in a CQ. Next, at step 1004, the controller checks whether $QL_i$ for CQ(i) is equal to zero. $QL_i$ represents the number of cells stored in CQ(i). If the number of cells stored in CQ(i) is zero, then the controller will need to generate a token T(i) for CQ(i) (step 1006) to account for the fact that CQ(i) has transitioned from being nonbacklogged to being backlogged. Then, the controller will store the newly-generated token T(i) in scheduling queue Q($h^i$) (step 1008). Thereafter, at step 1010, the controller will increment $QL_i$. The controller will also reach step 1010 from step 1006 if it determines that $QL_i>0$ (meaning that steps 1006 and 1008 can be bypassed because T(i) already exists).

As shown in step 1008 of FIG. 11, once T(i) is created, the controller stores T(i) in the waiting pool of scheduling queue Q($h^i$). The value of $h^i$, which is a function of $W^i$, can be either stored in table 124 or calculated on the fly according to $W^i$. The formula below represents how $h^i$ is calculated:

$$h^i = \max\{r, \text{ for all } r\text{'s where } W^i_r = 1\} \qquad (1)$$

wherein $W^i$ is the connection weight value assigned to CQ(i). According to this formula, $h^i$ represents the most significant bit in $W^i$ that is equal to 1. Thus, the controller creates a token T(i) only when CQ(i) goes from being empty to backlogged (when a first cell is stored therein), and stores new tokens T(i) in the scheduling queue associated with the most significant bit in $W^i$ that is equal to the predetermined value of 1 (basically, the eligible scheduling queue for T(i) having the highest scheduling weight).

Figure 12:
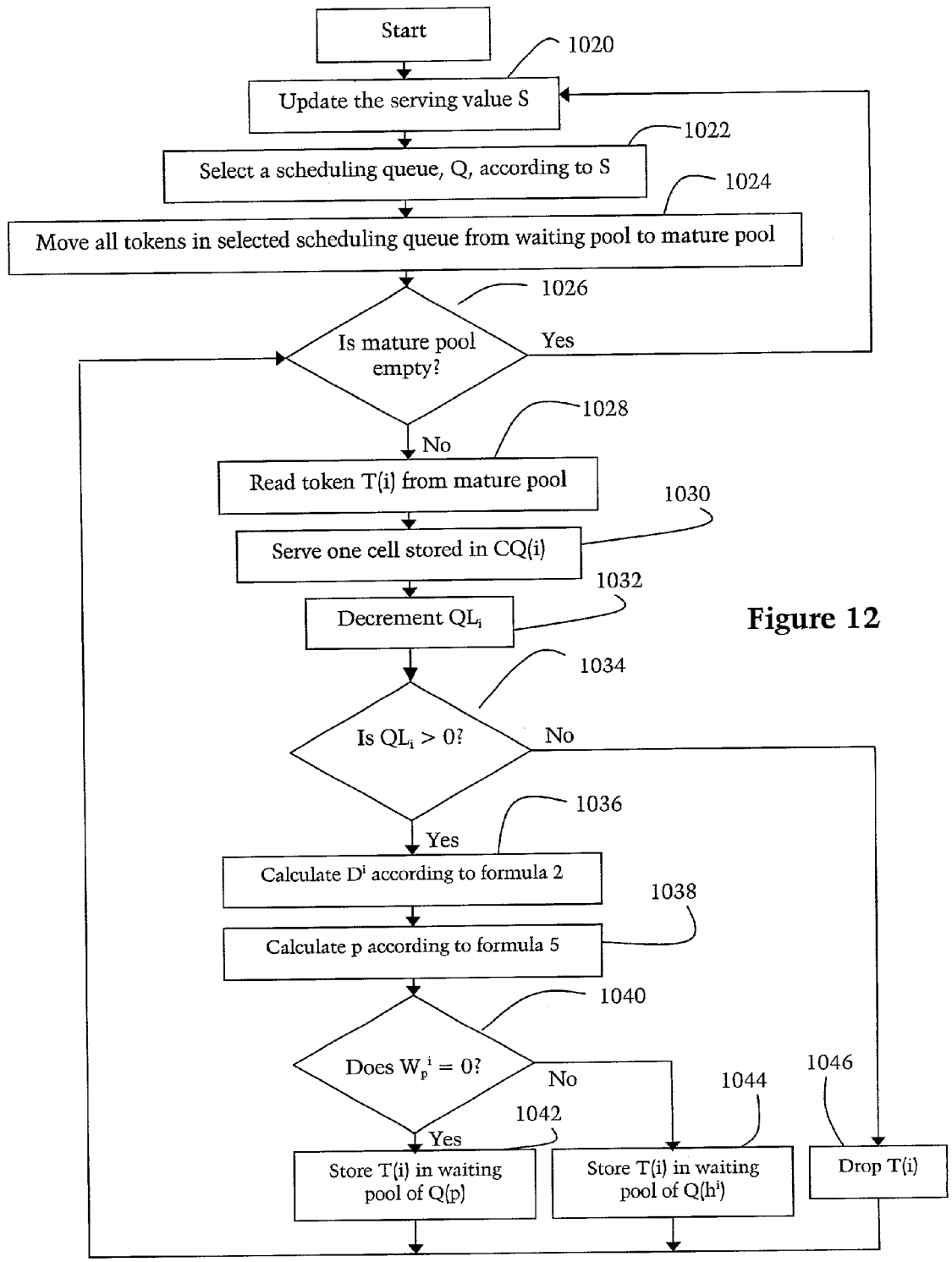
FIG. 12 is a flowchart illustrating how the controller selects scheduling queues according to the serving counter value, serves connection queues, and redistributes tokens in the case of scheduling fixed length packets.

FIG. 12 is a flowchart depicting how the controller 122 serves connection queues and redistributes tokens. At step 1020, the controller updates the serving values of the serving counter 120. This update can be a fixed single step incrementation (i.e., $S_{NEXT}=S_{CURRENT}+1$). However, because the scheduling queue that will be selected according to such a fixed incremental update may be empty (have no tokens stored therein), it is preferable to dynamically update the serving value S in a manner such that empty scheduling queues are skipped, as will be explained in more detail below.

After updating S (either incrementally or dynamically), the controller, at step 1022, selects a scheduling queue according to S (as described above in connection with FIGS. 9 and 10). Then, at step 1024, the controller moves all of the tokens stored in the waiting pool of the selected scheduling queue to the mature pool. At step 1026, the controller determines whether the mature pool of the selected scheduling queue is empty. If it is empty, the controller loops back to step 1020 and updates S. If it is not empty, the controller proceeds to step 1028 where it reads the first token T(i) stored in the mature pool. Thereafter, at step 1030, the controller 122 will serve CQ(i) by providing one cell stored in CQ(i) to the common resource.

Once the controller has served CQ(i), it should decide how to redistribute T(i). T(i) will either be dropped (if CQ(i) is empty after having one cell dequeued therefrom), or fed back to the waiting pool of the same scheduling queue or redistributed to another eligible scheduling queue according to the value of $D^i$, which will be explained below (if CQ(i) remains backlogged after having one cell dequeued therefrom). At step 1032, the controller will decrement $QL_i$ by one because of the fact that one cell was dequeued from CQ(i) at step 1030. Then, at step 1034, the controller will determine whether CQ(i) is still backlogged by checking whether $QL_i>0$. If $QL_i=0$, then the controller jumps to step 1046 and drops T(i). CQ(i) will then have to wait for a new cell to be stored therein before a token is created therefor (see FIG. 11). If $QL_i>0$, then the controller will proceed to step 1036 and begin deciding how to redistribute T(i).

At step 1036, the controller will calculate a distribution value $D^i$ for T(i). The distribution value is calculated according to the formula below:

$$D^i = (S+I^i) \bmod (2^N) \quad (2)$$

wherein S is the serving value, and wherein $I^i$ is an N bit incremental value, $I_{N-1}^i \ldots I_0^i$, for CQ(i). Like $h^i$, $I^i$ is a function of $W^i$, and can be either stored in table 124 or calculated on the fly according to $W^i$. $I^i$ can be calculated according to the formula below:

$$I_{j^i}^i=1; I_m^i=0 \text{ (for all } m \neq j^i) \quad (3)$$

wherein $j^i$ is calculated according to the formula:

$$j^i = N-1-\max\{k, \text{ for all } K\text{'s where } W_k^i=1\} \quad (4)$$

Once $D^i$ is calculated at step 1036 according to formula 2, the controller proceeds to step 1038 and calculates a value for p. The value for p is calculated according to the formula:

$$p = N-1-\min\{t, \text{ for all } t\text{'s where } D_t^i=1\} \quad (5)$$

Once p has been calculated, the controller checks whether $W_p^i=1$ (step 1040). If $W_p^i=1$, then the controller proceeds to step 1042 where it stores T(i) in the waiting pool of Q(p). If $W_p^i \neq 1$, then the controller proceeds to step 1044 where it stores T(i) in the waiting pool of $Q(h^i)$.

The sum total of steps 1036 through 1044 is to redistribute the token T(i) for backlogged connection queue CQ(i) into an eligible scheduling queue that will be selected by the controller the soonest of each eligible scheduling queue.

From either step 1042, 1044, or 1046, the controller will loop back to step 1026 and check whether another token is stored in the selected scheduling queue. If so, the controller will read the next token stored therein (step 1028) and perform steps 1030 through 1046 accordingly. That process will continue until no more tokens are stored in the mature pool of the selected scheduling queue, at which time the controller will loop back to step 1020 and update the serving value.

The division of each scheduling queue into a waiting pool and a mature pool is useful because the token redistribution process may often result in a token being fed back to the same scheduling queue. To prevent the feedback token from being read out repeatedly during the same serving value, tokens are initially stored in the waiting pools, and only tokens stored in the mature pool will be read out for service.

EXAMPLE 1

Token Storage/Redistribution

An example will help illustrate how the token redistribution process is performed using formulas 1 through 5. In this example, we will set N=4 (as shown in FIGS. 9 and 10). CQ(i) will have 4 cells stored therein. When the first cell arrives in CQ(i), a token T(i) will be created therefor and stored in the waiting pool of $Q(h^i)$, as described in connection with FIG. 11. The connection weight value $W^i$ for CQ(i) will be $W^i=W_3^i W_2^i W_1^i W_0^i=0111$. Thus, as explained in connection with FIG. 10, the eligible scheduling queues for T(i) will be Q(2), Q(1) and Q(0). Under formula 1, $h^i$ will calculate out as $h^i=\max\{2,1,0\}=2$ (because $W_2^i$, $W_1^i$, $W_0^i$ all equal 1). Thus, T(i) will initially be stored in $Q(h^i)=Q(2)$. If we assume T(i) was first placed in Q(2) when $S=S_3 S_2 S_1 S_0=0101$, then at the next update of S to S=0110, Q(2) will be selected (see FIG. 9). When Q(2) is selected, T(i) will be read out of Q(2), and one cell in CQ(i) will be served. Once one cell in CQ(i) is served, CQ(i) will remain backlogged because there are still three cells stored therein. Thus, T(i) will need to be redistributed.

While the value of $I^i$ is constant and is stored in memory 124, it is helpful to see how $I^i$ is computed. As explained above, $j^i$ must first be calculated according to formula 4 as follows:

$$j^i = 4-1-\max\{2,1,0\} = 4-1-2 = 1.$$

Having calculated $j^i$, $I^i$ can be calculated according to formula 3 as follows:

$$I_1^i=1; I_3^i=I_2^i=I_0^i=0 \rightarrow I^i=0010.$$

Now that $I^i$ is known, $D^i$ is calculated according to formula 2 as follows:

$$D^i = S + I^i = 0110 + 0010 = 1000.$$

From $D^i$, a value for p can be calculated according to formula 5 as follows:

$$p = 4-1-\min\{3\} = 4-1-3 = 0.$$

Then, as follows from step 1040 in FIG. 7, because $W_p^i = W_0^i = 1$, T(i) is moved to the waiting pool of Q(p)=Q(0).

Because T(i) is moved to Q(0), T(i) will be located in the scheduling queue that will be the next-selected of the eligible scheduling queues for T(i). When S is updated to S=0111, Q(3) will be selected, and the service process of FIG. 12 will proceed for Q(3). Then, S will be updated to S=1000 and Q(o) will be selected. When Q(0) is selected, T(i) will once again be read out, and one cell will be dequeued from CQ(i). However, CQ(i) will remain backlogged because two cells will remain stored therein. Thus, T(i) will need to be redistributed once again. $I^i$ is 0010 (as explained above), and $D^i$ will once again be calculated according to formula 2 as $$D_i = S + I^i = 1000 + 0010 = 1010.$$

Then, using formula 5 to calculate p, p will be determined as:

$$p = 4-1-\min\{3,1\} = 4-1-1 = 2.$$

Because $W_p^i = W_2^i = 1$, T(i) will be stored in the waiting pool of Q(p)=Q(2).

S will next be updated to S=1001, which results in Q(3) being selected. Upon the next S update, S will be 1010, which will result in Q(2) being selected. When Q(2) is selected, T(i) will once again be read out and one cell will be dequeued from CQ(i). However, CQ(i) will remain backlogged because one cell will remain stored therein. Thus, T(i) will once again need to be redistributed.

During this redistribution, $I^i$ will still be 0010. $D^i$ will calculate out as $D^i = S + I^i = 1010 + 0010 = 1100$. From $D^i$, p will calculate out as $p = 4-1-\min\{3,2\} = 1$. Because $W_p^i = W_1^i = 1$, T(i) will be stored in the waiting pool of Q(p)=Q(1).

S will next be updated to S=1011, which results in Q(3) being selected. Upon the next S update, S will be 1100, which results in Q(1) being selected. When Q(1) is selected, T(i) will once again be read out, and one cell will be dequeued from CQ(i). CQ(i) will now be empty because no more cells are stored therein. Thus, T(i) will be dropped, and CQ(i) will not have an associated token until another cell is stored therein.

EXAMPLE 2

Token Storage/Redistribution

In this second example, N will be 4, CQ(i) will have 4 cells stored therein, $W^i=W^i_3 W^i_2 W^i_1 W^i_0=1010$, and T(i) will initially be stored in Q($h^i$) (as shown in FIG. 11). The value for $h^i$ can be calculated according to formula 1 as $h^i=\max\{3,1\}=3$. Thus, T(i) is initially stored in Q(3). The serving value will be 0011. When S=0011, Q(3) is selected, and T(i) will be read therefrom. One cell will be dequeued from CQ(i), leaving CQ(i) backlogged because three cells remain stored therein. Thus, T(i) will be redistributed according to $D^i$.

The value for $j^i$ can be calculated according to formula 4 as:

$$j^i=4-1-\max\{3,1\}=0.$$

Thus, under formula 3, $I^i$ will be $I^i_3 I^i_2 I^i_1 I^i_0=0001$. $D^i$ will be calculated according to formula 2 as $D^i=S+I^i=0011+0001=0100$. Then, p will be calculated according to formula 5 as:

$$p=4-1-\min\{2\}=1.$$

Because $W^i_p=W_{i1}=1$, T(i) will be stored in the waiting pool of Q(p)=Q(1).

S will next be updated to 0100, which results in Q(1) being selected. Because Q(1) is selected, T(i) will be read out, and one cell will be dequeued from CQ(i). CQ(i) will remain backlogged because two cells remain stored therein. Thus, T(i) will need to be redistributed. $I^i$ is 0001, and $D^i$ will be $S+I^i=0100+0001=0101$. Having $D^i$ known, $p=4-1-\min\{2,0\}=3$. Because $W^i_p=W^i_3=1$, T(i) will be stored in Q(p)=Q(3).

S will next be updated to 0101, which results in Q(3) being selected. Because Q(3) is selected, T(i) will once again be read out, and one cell will be dequeued therefrom. CQ(i) will remain backlogged because one cell remains stored therein. Thus, T(i) will need to be redistributed. $D^i$ will be $S+I^i=0101+0001=0110$. From $D^i$, $p=4-1-\min\{2,1\}=2$.

For this redistribution, $W^i_p=W^i_2 \neq 1$. Thus, as shown in FIG. 12, the controller will jump to step 1044 from step 1042, and store T(i) in Q($h^i$)=Q(3). Q(3) is chosen as the appropriate scheduling queue to hold T(i) because it is the next eligible scheduling queue that will be served as the serving counter cycles through serving values.

S will next be updated to S=0110, which results in Q(2) being selected. After all connection queues having a token stored in Q(2) are served, S will be updated to S=0111, which results in Q(3) being selected. When Q(3) is selected, T(i) will once again be read out, and one cell will be dequeued from CQ(i). CQ(i) will now be empty because no cells are left therein. Because CQ(i) is empty, T(i) will be dropped, and a new cell must arrive in CQ(i) for a new T(i) to be created.

Dynamic Updating of the Serving Counter Value

As briefly explained above, one feature of the present invention is how the serving counter can be dynamically updated according to whether the scheduling queues have tokens stored therein. In one operating mode, the serving value is incremented by one each service time (single step mode). While the single step mode has an advantage in that it is easily implemented, it also has a drawback in that the controller will continue to cyclically select scheduling queues regardless of whether the scheduling queues have tokens stored therein. This wasteful result can be particularly troublesome if a high weight scheduling queue (which will be selected often) is empty.

To decrease the number of times that the controller selects an empty scheduling queue, a second operating mode for updating the serving counter is disclosed wherein the controller dynamically updates the serving value such that some of the empty scheduling queues are skipped. Under the dynamic mode, the serving value is updated according to the following formula:

$$S_{NEXT}=(S_{CURRENT}+2^{N-1-\max\{x_c,q\}}) \mod(2^N) \qquad (6)$$

wherein $S_{NEXT}$ represents the next serving value, $S_{CURENT}$ represents the current serving value, $x_c$ represents the scheduling queue that has just been served, Q($x_c$), and q represents the scheduling queue, Q(q), having the highest scheduling weight among non-empty scheduling queues.

An example will help illustrate the operation of formula 6. Referring to the 4 bit serving value example of FIG. 9, the current serving value, $S_{CURRENT}$, will be 0010, meaning that $x_c$ will be 2 because Q(2) is selected when $S_{CURRENT}=0010$.

If the nonempty scheduling queue having the highest scheduling weight is Q(1), meaning that q=1, then it is desirable to update the serving counter such that the controller will skip selection of Q(3), which is empty (but is next-in-line for selection under the single step mode). By dynamically updating the serving value using formula 6, $S_{NEXT}=0010+2^{4-1-\max\{2,1\}}=0010+2^1=0010+0010=0100$. By jumping from a serving valve of 0010 to a serving value of 0100, the controller will select Q(1), and will skip the selection of Q(3).

While formula 6 does not guarantee that the serving value will be updated such that the serving value will always jump directly to the non-empty scheduling queue having the highest scheduling weight, formula 6 will always result in a decrease in the number of steps required to reach the nonempty scheduling queue by skipping at least one empty scheduling queue.

For example, using FIG. 8 as the reference, if $S_{CURRENT}=0010$ (meaning $x_c=2$), and q=0 (meaning Q(0) is the non-empty scheduling queue having the highest scheduling weight), then the serving counter will first be updated under formula 6 as follows:

$$S_{NEXT}=0010+2^{4-1-\max\{2,0\}}=0010+2^1=0010+0010=0100.$$

When $S_{NEXT}$ becomes $S_{CURRENT}$, Q(1) will be selected (see FIG. 9). However, because Q(1) is empty, the serving counter will once again need to be updated (see step 1026 of FIG. 12). This time, $S_{NEXT}$ will be calculated as follows ($x_c$ is now 1):

$$S_{NEXT}=0100+2^{4-1-\max\{1,0\}}=0100+2=0100+0100=0110.$$

When $S_{NEXT}$ becomes $S_{CURRENT}$, Q(2) will be selected (see FIG. 9). However, because Q(2) is empty, the serving counter will once again need to be updated. This time, $S_{NEXT}$ will be calculated as follows ($x_c$ is now 2):

$$S_{NEXT}=0110+2^{4-1-\max\{2,2\}}=0110+2^1=0110+0010=1000.$$

When $S_{NEXT}$ becomes $S_{CURRENT}$, Q(0) will be selected. Because Q(0) has tokens stored therein, connection queues can be served.

Under this example, two intermediate serving values were required to jump from S=0010 to S=1000 so that a nonempty scheduling queue (Q(0)) could be selected. However, if a single step mode was used to update the serving counter, 5 intermediate steps would be required to go from S=0010 to S=1000 (see FIG. 9). Thus, even though two serving values were wasted on empty scheduling queues, formula 6 nevertheless represents a vast improvement over the rigid single step mode.

C. Tokens

Each token T(i) associated with a connection queue CQ(i) is some sort of connection queue identifier that allows the controller to determine which connection queue needs servicing. In the preferred embodiment, each token T(i) is a pointer to the memory location in CQ(i) where the next cell to be dequeued therefrom is stored.

Figure 13:
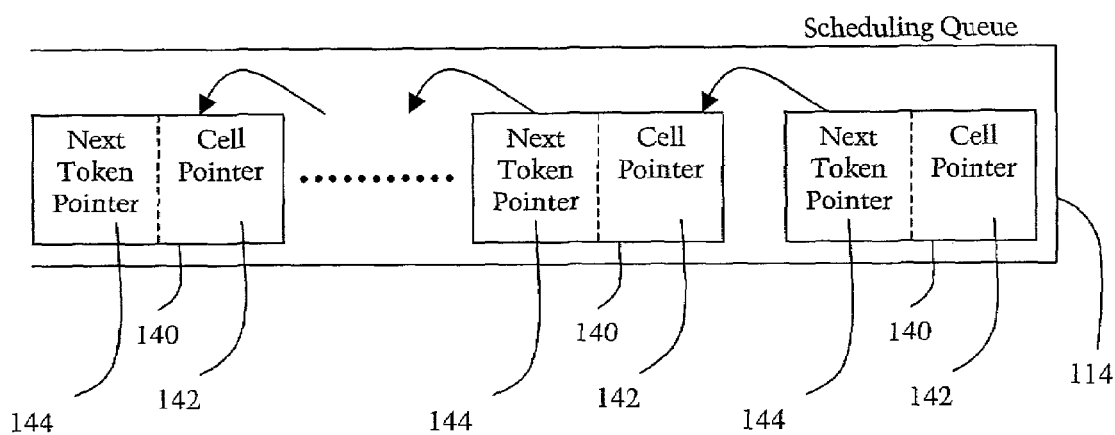
FIG. 13 shows how tokens can be stored in the scheduling queues.

FIG. 13 depicts a possible token arrangement in a scheduling queue 114. It should be easily understood that the tokens of the present invention can be implemented in a variety of ways, and that the example of FIG. 13 is illustrative rather than limiting. Scheduling queue 114 has a plurality of tokens 140 stored therein. Each token 140 has a cell pointer 142 and a next token pointer 144. Each cell pointer 142 identifies the memory location in the connection queue associated with that token where the next cell to be dequeued therefrom is stored. The cells in each connection queue can be stored together using linked lists as is known in the art. Each next token pointer 144 will identify the location in the scheduling queue 114 where the next token 140 is stored.

D. Scheduling Algorithm for Variable Length Packets

The present invention may also perform scheduling for variable length packets; variable length packets being packets that have a length made up of a variable number of cells. The length of the packet is determined from the number of cells included therein. To support scheduling for variable length packets, the algorithm and scheduler described above in connection with fixed length packets is preferably altered as explained below.

Figures 14, 15:
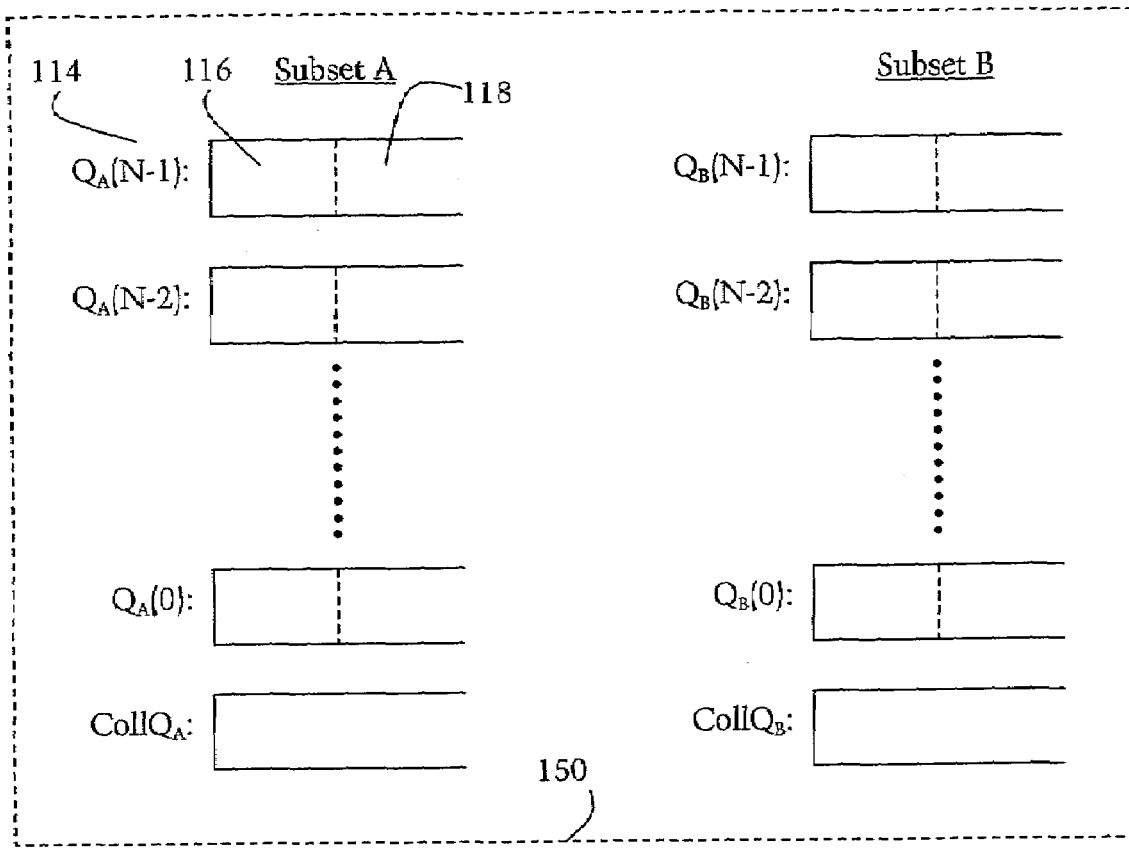
FIG. 14 illustrates the dual scheduling queue sets for the case of scheduling variable length packets.
FIG. 15 is a table illustrating scheduling queues that are eligible for selection as a function of subround number for the case of scheduling variable length packets.

First, referring to FIG. 14, the scheduling queue set of the fixed length case is replaced with a scheduling queue set 150. Scheduling set 150 comprises a scheduling queue subset A and a scheduling queue subset B. Each subset includes N scheduling queues Q(N−1) through Q(0) as noted above in connection with the fixed length scheduling algorithm and a collection queue.

Also, the concept of subrounds is preferably introduced to the serving cycle. In the fixed length case described above, the serving cycle comprised the full roundtrip of the N bit serving counter from serving counter values of 1 to $2^{N-1}$. In the variable length case, a subround SR comprises the full roundtrip of the N bit serving counter from serving counter values of 1 to $2^{SR-1}$. There will be N subrounds in a serving cycle. The default step size between serving counter values for the serving counter will be the $2^{SR-1}$ ($S_{NEXT}=S_{CURRENT}+2^{SR-1}$). Thus, the pool of scheduling queues eligible to be selected will decrease as the subround increases. FIGS. 15 and 16 illustrate this concept.

As shown in FIG. 15, during subround 1 (SR=1), all scheduling queues will be eligible for selection. The selection of scheduling queues as a function of serving counter value will be the same as described above in connection with the fixed length embodiment. However, when SR=2, the scheduling queue having the highest scheduling weight—Q(N−1)—is no longer eligible to be selected. This fact is due to the step size between serving values being equal to $2^{SR-1}$. Thus, the serving counter will not reach values that dictate the selection of Q(N−1) during subrounds subsequent to subround 1. This pattern repeats itself until subround N (SR=N) where only the scheduling queue with the lowest scheduling weight—Q(0)—is eligible for selection.

FIG. 16 illustrates the serving values for a serving cycle and scheduling queue selected therefrom for an example where N=3. During the first subround (SR=1), S will reach all values and each scheduling queue—Q(2), Q(1), and Q(0)—is selected accordingly. As can be seen, the step size between successive S values is equal to 1 (or $2^{SR-1}=2^{1-1}=2^0$). Once S wraps around, the next subround begins (SR=2). This time, the step size is 2 (or $2^{SR-1}=2^{2-1}=2^1$). Therefore, the serving values during subround 2 will be 010, 100, and 110. As can be seen, Q(2) will not be selected during subround 2. As S once again wraps around, the subround is increased to 3, which in this case is the final subround of the serving cycle because N=3. During subround 3, the step size is 4 (or $2^{SR-1}=2^{3-1}=2^3$). During subround 3, the only scheduling queue to be selected is Q(0).

During a given serving cycle, only one scheduling queue subset is active. By extension, the other scheduling queue subset is inactive. Tokens will be read only from active scheduling queues. Tokens are preferably distributed to either active scheduling queues, inactive scheduling queues, or the inactive collection queue. Upon the completion of each serving cycle, the active set of scheduling queues switches. Thus, at the completion of the serving cycle, the active scheduling queue subset becomes inactive and the inactive scheduling queue subset becomes active.

Another addition to the algorithm for scheduling variable length packets is the concept of residual weight. Each connection will have a residual weight associated therewith. Thus, each connection queue CQ(i) will not only have a connection weight $W^i$ assigned thereto, but also a residual weight $RW^i$. While the connection weight $W^i$ is a constant value, the residual weight will initially be set equal to $W^i$ but thereafter will be adjusted to reflect the amount of service given to CQ(i) in terms of the length of packets served from CQ(i). Each $RW^i$ preferably comprises N+1 bits—$RW^i_{N+1}RW^i_N \ldots RW^i_1 RW^i_0$. The N+1th bit (the most significant bit) will indicate whether RW is positive or negative (a 0 meaning positive and 1 meaning negative) and the lower N bits representing the residual weight.

Figure 17:
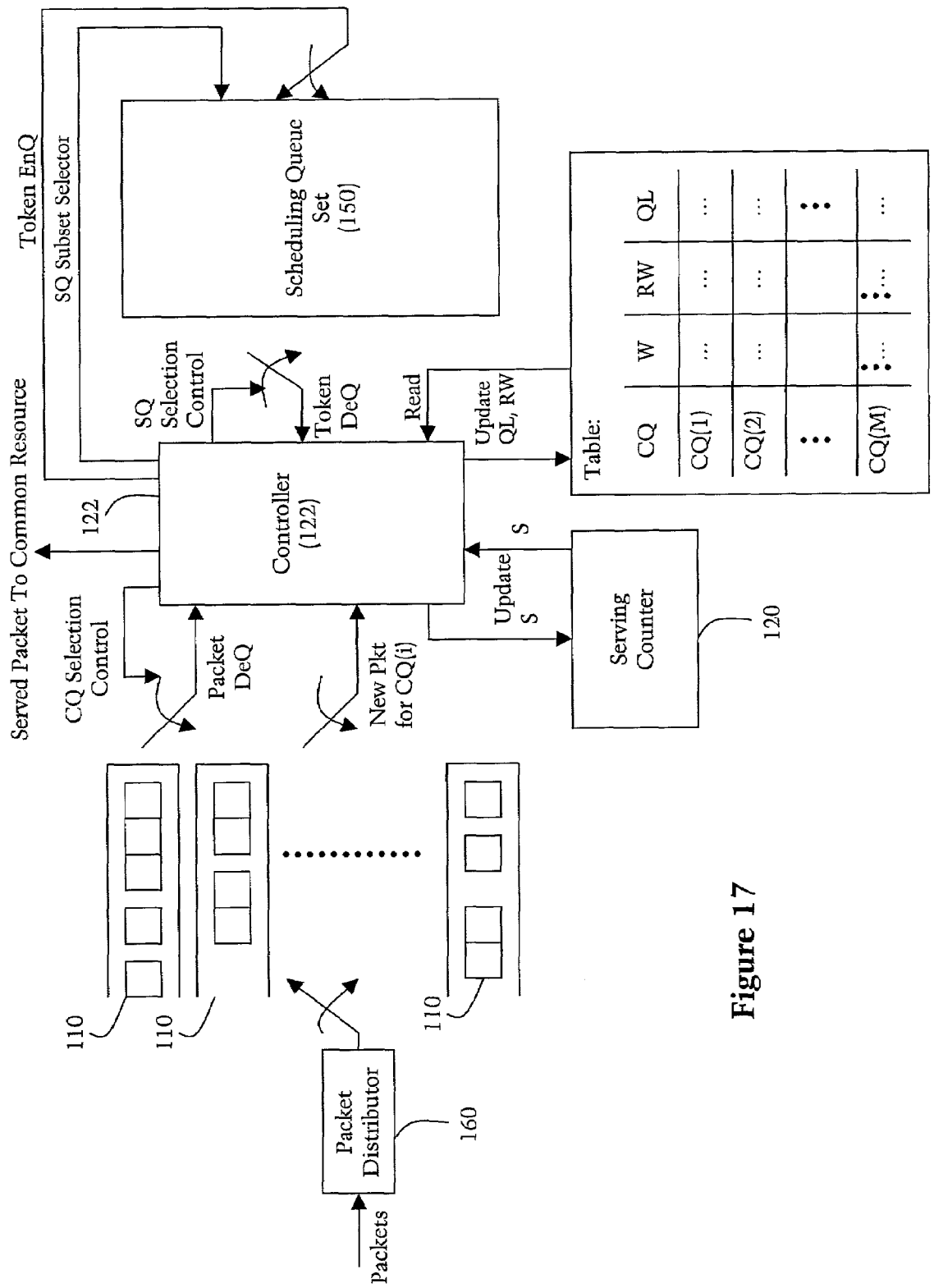
FIG. 17 is an overview of the variable length packet scheduler.

FIG. 17 illustrates the scheduler for the variable length packet embodiment. Incoming packets are received by the packet distributor 160. The packet distributor segments the received packets into cells and distributes those cells to their corresponding connection queue. The cells in each connection queue 110 make up packets. Each packet in a connection queue 110 is shown in FIG. 17 by cells that abut each other. Thus, in the topmost connection queue 110, the packet at the head of the queue is 4 cells in length and the second packet is one cell in length. In the bottommost connection queue 110, the first two packets are each one cell in length while the third packet is two cells in length. As can be seen, the controller 122 will also maintain a residual weight RW for each connection queue 110.

Figure 18:
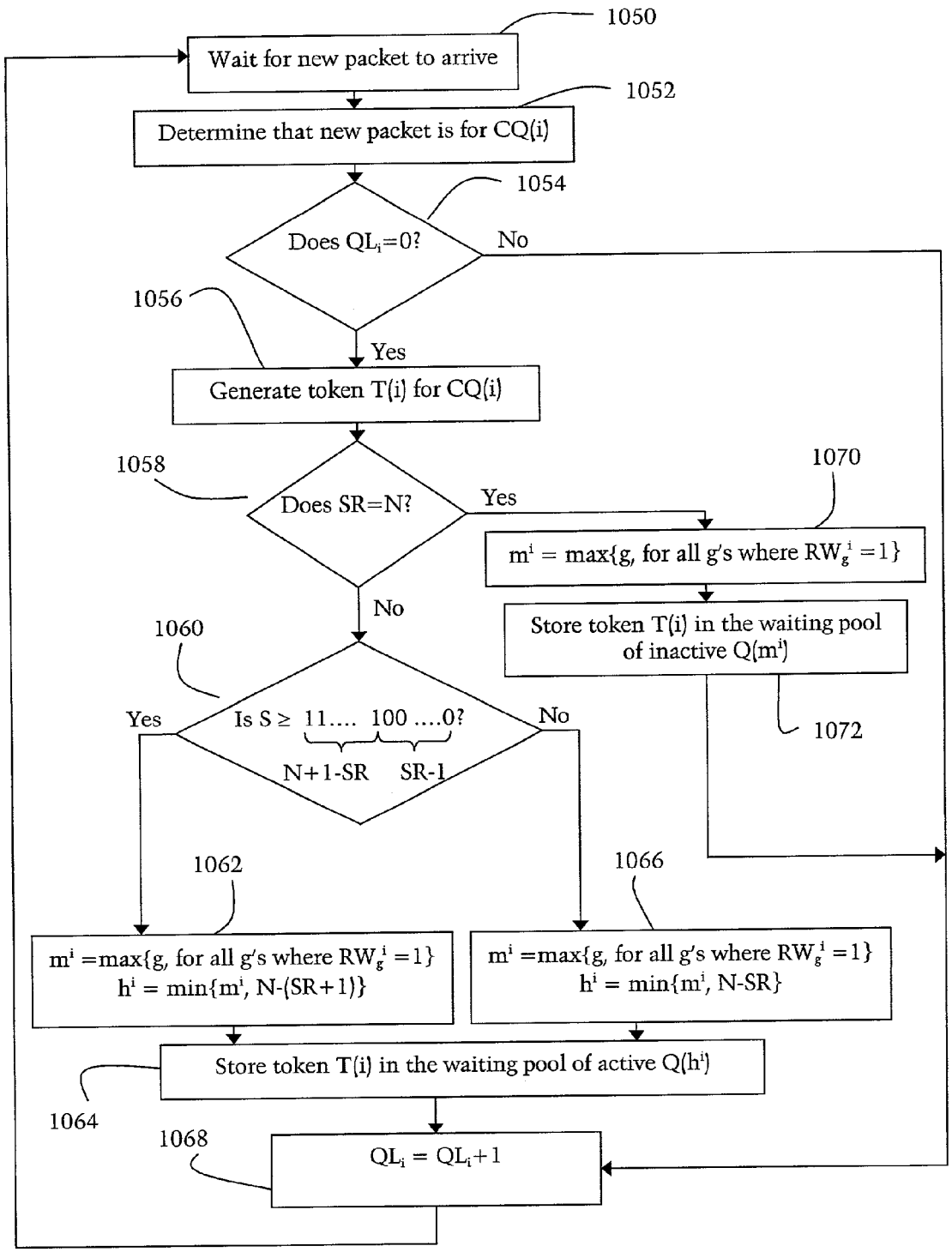
FIG. 18 is a flowchart depicting how the controller creates and initially stores tokens in the case of scheduling variable length packets.

The initial distribution of tokens into scheduling queues will proceed in an almost identical fashion as that of the fixed length embodiment with some adjustments to account for the use of subrounds in the serving cycle and the use of residual weight. FIG. 18 is a flowchart illustrating how new tokens are created and initially distributed.

Steps 1050 through 1056 and step 1068 parallel steps 1000 through 1006 and step 1010 in FIG. 11 except the focus is on packets rather than cells. If a packet's arrival in a connection queue CQ(i) causes that connection queue to transition from a nonbacklogged state to a backlogged state, then a new token T(i) is created for CQ(i). Steps 1058 through 1064 address determining the proper scheduling queue into which T(i) should be queued. In the fixed length embodiment, the appropriate scheduling queue is the scheduling queue having the highest scheduling weight among scheduling queues that are eligible for the token (eligibility being determined from $W^i$). However, in the variable length embodiment, $RW^i$ is the appropriate measure of where a token should be queued because the residual weight value is adjusted to reflect past service given to a connection queue. Also, because of the subround implementation, the appropriate scheduling queue into which to queue T(i) will also depend on SR given that it is possible that a particular scheduling queue will not be selected during the current subround.

Thus, at step 1058, the algorithm checks whether the serving cycle is in its final subround. If it is (SR=N), then it is appropriate to queue T(i) in one of the scheduling queues in the inactive subset because that set is soon to become the active subset (only the scheduling queue having the lowest scheduling weight will be selected when SR=N). Therefore, at step 1070, the algorithm identifies the particular scheduling queue having the highest scheduling weight from the scheduling queues that are eligible to store the token (Q($m^i$)). In this case, a scheduling queue Q(g) is eligible to store T(i) if $RW_g^i$=1. The scheduling queue Q(g) of the inactive subset having the largest value for g ($m^i$ being the largest of these g's) is selected as the scheduling queue into which to store T(i) (step 1072).

If step 1058 results in a determination that the final subround of the serving cycle has not been reached, then the algorithm next checks whether the serving value is on its last value for the particular subround in which the serving cycle exists (step 1060). If the most significant N+1−SR bits of S all equal 1 and the least significant SR−1 bits of S all equal 0, then the current value for S is the last value for S of the subround. For example, as can be seen from FIG. 16, the last serving value for subround 1 is 111 (N+1−SR=3, SR−1=0), the last serving value for subround 2 is 110 (N+1−SR=2, SR−1=1). It should be noted that step 1060 will not be reached when SR=N.

If S is on its last value for the subround, the algorithm preferably ensures that T(i) will not be queued in a scheduling queue not eligible for selection during the next subround (see FIG. 15 for scheduling queue selection eligibility as a function of subround). Thus, at steps 1062 and 1064, after the scheduling queue having the highest scheduling weight among eligible scheduling queues as determined from $RW^i$ is identified (Q($m^i$), where $m^i$=max{g, for all g's where $RW_g^i$=1}), the algorithm either stores T(i) in Q($m^i$)— if Q($m^i$) is eligible for selection during the coming subround—, or stores T(i) in Q(N−(SR+1))—if Q($m^i$) is not eligible for selection during the coming subround. Q(N−(SR+1)) represents the scheduling queue having the highest scheduling weight that will be selected during the coming subround. The value $h^i$, where $h^i$=min{$m^i$, N−(SR+1)}, represents the result of this decision-making process. T(i) is stored in the waiting pool of Q($h^i$) in the active subset at step 1064.

If S is not on its last serving value for the subround, then the algorithm proceeds to step 1066 from step 1060. At steps 1066 and 1064, after the scheduling queue having the highest scheduling weight among eligible scheduling queues as determined from $RW^i$ is identified (Q($m^i$)), the algorithm either stores T(i) in Q($m^i$)—if Q($m^i$) is eligible for selection during the current subround—, or stores T(i) in Q(N−SR)— if Q($m^i$) is not eligible for selection during the current subround. Q(N−SR) represents that scheduling queue having the highest scheduling weight that will be selected during the current subround. The value $h^i$, where $h^i$=min{$m^i$, N−SR}, represents the result of this decision-making process. T(i) is stored in the waiting pool of Q($h^i$) in the active subset at step 1064.

From steps 1054, 1064, and 1072, the algorithm proceeds to step 1068 where $QL_i$ is incremented. $QL_i$ represents the number of packets queued in CQ(i).

Figure 19:
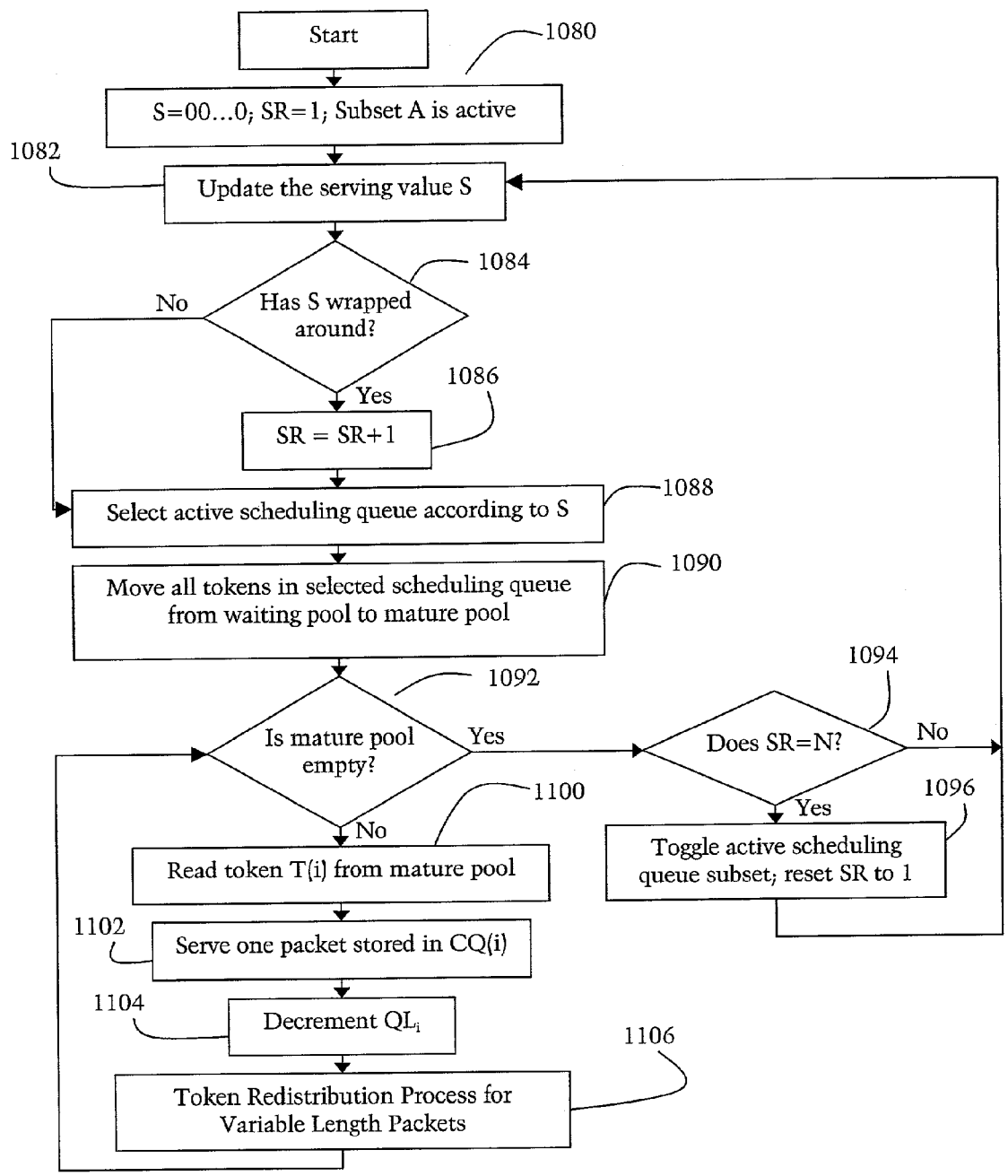
FIG. 19 is a flowchart illustrating how the controller selects scheduling queues according to serving value, serves connection queues, and redistributes tokens in the case of scheduling variable length packets.

FIG. 19 is a flowchart illustrating how the scheduling algorithm processes tokens stored in the scheduling queues to serve packets. At step 1080, the serving value is initialized to 0, the subround is initialized to 1, and scheduling queue subset A is rendered active. At step 1082, the serving value is incremented. This incrementation may be done using either the fixed step size of $2^{SR-1}$, or the dynamic step size described above in connection with formula 6. At step 1084, the algorithm checks whether S has wrapped around. If it has, then the subround is incremented (step 1086).

Step 1088 is reached from either step 1084 (if S has not wrapped around), or step 1086 (if S has wrapped around). At step 1088, a scheduling queue is selected according to the serving value. Scheduling queue selection as a function of serving value proceeds as described above in connection with the fixed length embodiment (see FIG. 8).

After a scheduling queue is selected, all tokens stored in the waiting pool of the selected scheduling queue are transferred to the mature pool (step 1090). If there were no tokens to move to the mature pool (as determined at step 1090), then the algorithm proceeds to step 1094.

At step 1094, the subround number is checked to determine whether SR is equal to N (indicating that the serving cycle is complete). If the serving cycle is complete, then at step 1096, the active scheduling queue subset becomes inactive and the inactive scheduling subset becomes active. Also, the subround number is reset to 1. From step 1096, the algorithm loops back to step 1082 to update the serving value. Also, if SR is not the final subround of the serving cycle (as determined by step 1094), the algorithm will also loop back to step 1082.

If step 1092 determines that the mature pool is not empty, then at step 1100, a token T(i) is dequeued from the selected scheduling queue. Thereafter, the packet queued at the head of CQ(i) is served (step 1102) and $QL_i$ is decremented by one (step 1104). The algorithm next redistributes T(i) according to the algorithm of FIG. 20 (step 1106). Steps 1098 through 1106 are repeated until all tokens in the mature pool of the selected scheduling queue are processed. When all such tokens have been processed, the algorithm loops back to step 1082 and updates the serving value so that another scheduling queue may be selected.

Figure 20:
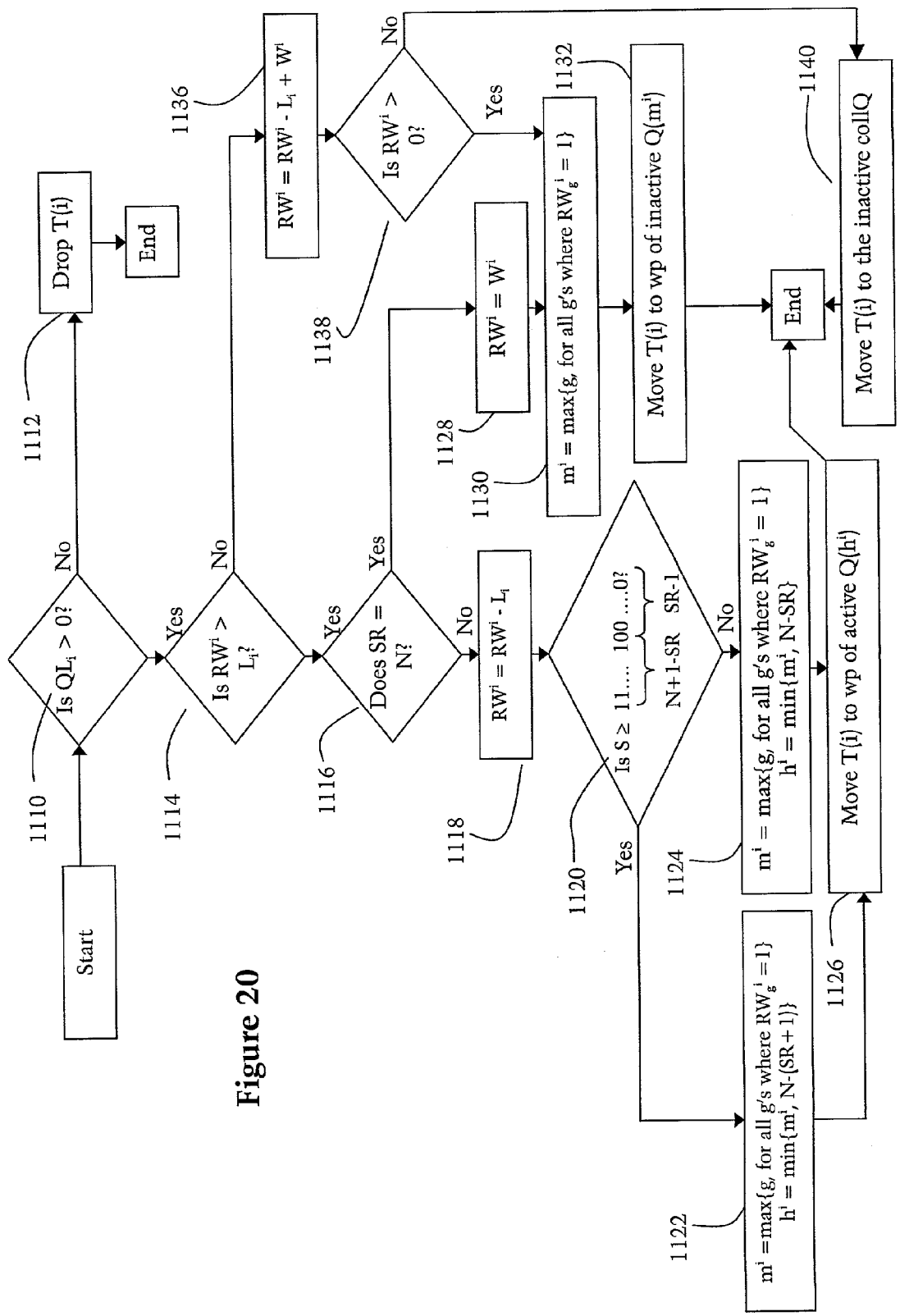
FIG. 20 is a flowchart illustrating the token redistribution process in the case of scheduling variable length packets.

FIG. 20 details the token redistribution process for the variable length packet embodiment. Generally, the algorithm of FIG. 20 is tailored to:

If a connection queue is no longer backlogged, that connection queue's token is dropped;

If a packet to be served from CQ(i) has a length $L_i$ larger than $RW_i$, then CQ(i) must borrow service that has been allocated thereto for the next serving cycle, and CQ(i) is thus no longer eligible for service during the current serving cycle;

If CQ(i) borrows only a portion of the next serving cycle's allocated service (which means that $RW^i-L_i+W^i>0$), then CQ(i) remains eligible for service during the next serving cycle, albeit with less service allocated thereto because of the loan made to accommodate the served packet. Since CQ(i) is eligible for service during the next serving cycle, T(i) is moved to a scheduling queue in the inactive subset (the inactive subset will be the active subset during the next serving cycle);

If CQ(i) borrows all of the next serving cycle's allocated service (or perhaps also another subsequent serving cycle's service) (which means that $RW^i-L_i+W^i<0$), then CQ(i) is not eligible for service during the next serving cycle. As such, T(i) is moved to the collection queue of the inactive subset where it will remain until enough serving cycles pass to make up for the loan made to accommodate the packet with length $L_i$. The collection queue serves as a repository for the tokens of connection queues that are ineligible for service.

At step 1110, the token redistribution process for T(i) begins. First, the algorithm checks whether CQ(i) is empty after serving a packet therefrom (is $QL_i>0$?). If CQ(i) is empty, T(i) is dropped (step 1112) and the process is complete. If CQ(i) remains backlogged, a new location for T(i) must be identified.

At step 1114, the residual weight for CQ(i) is compared with the length of the packet just served from CQ(i) ($L_i$ represents the length of that packet in terms of the number of cells that constitute the packet and is determinable from the packet's header information). First, if $RW^i$ is greater than $L_i$, this means that CQ(i) has not overused its allotted service amount during the current serving cycle. Second, if $RW^i$ is less than $L_i$, this means that service to CQ(i) has exceeded its allotted service amount during the current serving cycle. Third, if $RW^i=L_i$, this means the full service has been given to CQ(i) during the current serving cycle. Steps 1116 through 1132 address token redistribution for the first condition. Steps 1136 through 1140 and step 1132 address token distribution for the second and third conditions.

Step 1136 is reached when service to the packet queued at the head of CQ(i) results in service to CQ(i) equaling or exceeding the amount of service allotted thereto during the current serving cycle. When, a connection queue is overserved, it will not be served again until a subsequent serving cycle; which subsequent serving cycle will depend upon the degree of overservices that the connection queue has received. At step 1136, the residual weight value for CQ(i) is adjusted to reflect the packet served from CQ(i) (the residual weight is decreased by packet length) and the fact the CQ(i) will not be served until a subsequent serving cycle (the residual weight is also increased by connection weight W). Thus, at step 1136, $RW^i$ is set equal to $RW^i-L_i+W^i$, where $L_i$ is the served packet's length in cells.

Step 1138 evaluates the degree of overservice given to CQ(i). If the newly updated residual weight value for CQ(i) is a negative value or zero, this indicates that CQ(i) has been greatly overserved. As such, T(i) is moved to the collection queue of the inactive subset (step 1140) and the token redistribution process for T(i) is complete. T(i) will remain in the collection queue until enough serving cycles pass where $RW^i$ is no longer negative.

If the newly updated residual weight value is a positive value, this means that CQ(i) may be served during the next serving cycle. At step 1130, the appropriate scheduling queue in the inactive subset for storing T(i) is identified by computing $m^i$, wherein $m^i=\max\{g$, for all g's where $RW_g^i=1\}$. As noted above in connection with FIG. 18, $m^i$ represents the scheduling queue $Q(m^i)$ that has the highest scheduling weight among scheduling queues that are eligible to store T(i). At step 1132, T(i) is moved to the waiting pool of $Q(m^i)$ in the inactive subset, and the token redistribution process for T(i) is complete.

Step 1116 is reached when service to the packet queued at the head of CQ(i) did not result in CQ(i) overusing the amount of service allotted thereto during the current serving cycle. When CQ(i) has not been overserved, the algorithm seeks to move T(i) to the eligible scheduling queue (as determined from $RW^i$) that will be selected the soonest according to a subsequent serving value.

At step 1116, the subround number is compared with N. If SR=N, this means that the active subset of scheduling queues is about to toggle between Subset A and Subset B. Therefore, it is preferred that T(i) be moved to the waiting pool of the scheduling queue in the inactive subset (the inactive subset will soon be the active subset) that has the highest scheduling weight among eligible scheduling queues for the token. First, at step 1128, the value of $RW^i$ is reset to $W^i$. $RW^i$ is reset because CQ(i) will not be served again until the next serving cycle given that T(i) has been moved to the inactive subset. Any allotted amount of service left unused by a connection queue during a serving cycle (i.e., credit) will not be passed to the next serving cycle. However, as can be seen from step 1136 described above, deficits will be passed to the next serving cycle.

Next, at step 1130, the algorithm computes $m^i$. As noted above, $m^i$ represents the scheduling queue $Q(m^i)$ that has the highest scheduling weight among scheduling queues that are eligible to store T(i). At step 1132, T(i) is moved to the waiting pool of $Q(m^i)$ in the inactive subset, and the redistribution process for T(i) is complete.

If step 1116 results in a determination that the current subround is not the final subround of the serving cycle, this means that T(i) should be moved to one of the scheduling queues in the currently active subset. At step 1118, $RW^i$ is adjusted to reflect the service given to the packet that was queued at the head of CQ(i) ($RW^i$ is decremented by $L_i$). Next, at step 1120, the algorithm begins the process of determining the appropriate scheduling queue for storing T(i) by determining whether the current serving value is the last serving value of the current subround. If S is the last serving value of the current subround, then the most significant N+1−SR bits will equal 1 and the least significant SR−1 bits will equal 0.

If step 1120 results in a determination that S is on its last value for the subround, the algorithm preferably ensures that T(i) will not be queued in a scheduling queue not eligible for selection during the next subround (see FIG. 15 for scheduling queue selection eligibility as a function of subround). Thus, at steps 1122 and 1126, after the scheduling queue having the highest scheduling weight among eligible scheduling queues as determined from $RW^i$ is identified ($Q(m_i)$), the algorithm either stores T(i) in $Q(m^i)$ (if $Q(m^i)$ is eligible for selection during the coming subround), or stores T(i) in $Q(N-(SR+1))$ (if $Q(m^i)$ is not eligible for selection during the coming subround). $Q(N-(SR+1))$ represents the scheduling queue having the highest scheduling weight that will be selected during the coming subround. The value $h^i$, where $h^i=\min\{m^i, N-(SR+1)\}$, represents the result of this decision-making process. T(i) is stored in the waiting pool of $Q(h^i)$ in the active set at step 1126.

If step 1120 results in a determination that S is not on its last serving value for the subround, then the algorithm proceeds to step 1124. At steps 1124 and 1126, after the scheduling queue having the highest scheduling weight among eligible scheduling queues as determined from $RW^i$ is identified ($Q(m^i)$, the algorithm either stores T(i) in $Q(m^i)$ (if $Q(m^i)$ is eligible for selection during the current subround) or stores T(i) in $Q(N-SR)$ (if $Q(m^i)$ is not eligible for selection during the current subround). $Q(N-SR)$ represents that scheduling queue having the highest scheduling weight that will be selected during the current subround. The value $h^i$, where $h^i=\min\{m^i, N-SR\}$, represents the result of this decision-making process. T(i) is stored in the waiting pool of $Q(h^i)$ in the active set at step 1126.

Figure 21:
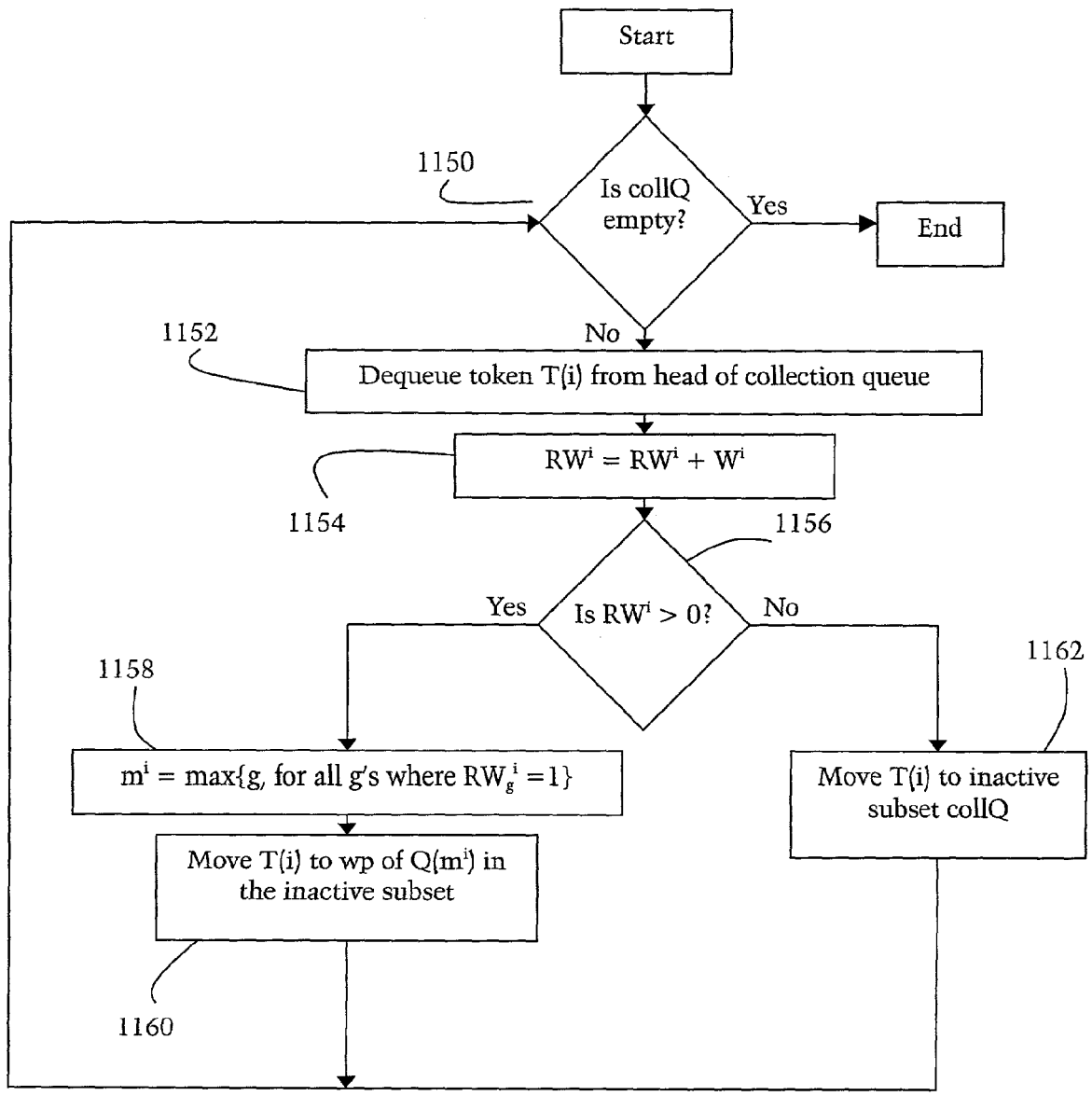
FIG. 21 is a flowchart illustrating how the controller processes tokens stored in the collection queue of the active scheduling queue set.

FIG. 21 illustrates the algorithm for processing tokens that are stored in the collection queue of the active subset. The process of FIG. 21 can run in parallel with the steps of FIGS. 18–20. As can be seen from step 1150, the process of FIG. 21 continues until no more tokens are stored in the collection queue. At step 1152, the token T(i) at the head of the collection queue is dequeued. At step 1154, the residual weight value for CQ(i) is increased by $W^i$ to reflect the fact that no service will be given to CQ(i) during the next serving cycle. At step 1156, the algorithm determines whether the newly updated residual weight value for CQ(i) is greater than zero. If $RW^i$ is greater than zero, then the algorithm moves T(i) to the waiting pool of $Q(m^i)$ in the inactive subset wherein $m^i$ is computed as noted above (steps 1158 and 1160). If $RW^i$ is less than or equal to zero, then the algorithm moves T(i) to the collection queue of the inactive subset (step 1162), where the token must again wait for the process of FIG. 21 to be revisited before the possibility of distribution to the waiting pool of a scheduling queue exists. From either step 1158 or step 1160, the algorithm loops back to step 1150 to check whether the collection queue is empty.

E. Other Considerations

The scheduling method of the present invention has been described in the context of scheduling objects such as cells or variable length packets traveling through a plurality of connections and competing for access to a common resource, such as a switch fabric input, a switch fabric output, or a multiplexer. However, it should be understood that the scheduling method of the present invention is not limited in its applications to data traffic over networks, and can be implemented as a general type scheduler where the common resource can be any type of device or link for which a plurality of connections compete for access, including but not limited to a CPU, shared database, etc.

Also, the relationship between scheduling queue selection and serving values has been described using 1's as the bit value from which bit patterns are set. However, it should be understood that a person could use a 0 as the predetermined value from which bit patterns are set. For example, after each scheduling queue is associated with a bit in the serving value, the controller can be configured to select a scheduling queue when the least significant bit in the serving value equal to 0 is the bit associated with the selected scheduling queue. In such a configuration, the unused state would be S=111 . . . 111. Similarly, the eligible scheduling queues for the placement of token T(i) associated with CQ(i) can be determined from the bits in $2^N-1-W^i$ or $2^N-1-RW^i$ that are equal to the predetermined value of 0 rather than 1.

Furthermore, the residual weight values maintained for each connection queue have been described wherein $RW^i$ tracks how much service remains available to CQ(i) by initially being set equal to $W^i$ and thereafter being decremented by the length of each packet served from CQ(i). It should be readily understood by those of ordinary skill in the art that $RW^i$ can also be maintained such that it is initially set to zero and is increased when CQ(i) is served by adding the length of the served packet thereto. In such cases, the decision-making process for token redistribution will partly depend on whether $RW^i$ has reached $W^i$ rather than whether $RW^i$ has reached 0.

It is easily understood that one having ordinary skill in the art would recognize many modifications and variations within the spirit of the invention that may be made to the particular embodiments described herein. Thus, the scope of the invention is not intended to be limited solely to the particular embodiments described herein, which are intended to be illustrative. Instead, the scope of the invention should be determined by reference to the claims below in view of the specification and figures, together with the full scope of equivalents allowed under applicable law.

What is claimed is:

1. A method of scheduling access to a common resource for a plurality of objects queued in a plurality of connection queues during a plurality of serving cycles, each serving cycle comprising a plurality of serving values, said method comprising:

maintaining a serving counter configured to cycle through the serving values of the serving cycle;

maintaining a scheduling queue set, the scheduling queue set comprising a plurality N of scheduling queues Q(N−1) through Q(0);

assigning a scheduling weight to each scheduling queue Q(k) of the scheduling queue set;

associating each serving value with a scheduling queue in a manner proportional to the scheduling weights assigned to the scheduling queues;

for each connection queue CQ(i), (1) assigning a connection weight $W^i$ thereto that is representative of a desired amount of service to be allotted to connection queue CQ(i) during each serving cycle;

for each CQ(i) that is backlogged, maintaining a token T(i) associated therewith;

storing each T(i) in a queue of the scheduling queue set at least partially as a function of (i) $W^i$, and (ii) the scheduling weights assigned to the scheduling queues;

for each serving value S of the serving counter, (1) selecting the scheduling queue associated therewith, and (2) for each T(i) stored in the selected scheduling queue, serving CQ(i) by (i) dequeuing an object therefrom and (ii) providing the dequeued object to the common resource.

2. The method of claim 1 wherein the token storing step comprises:

for each T(i), (1) associating at least one scheduling queue therewith as a scheduling queue eligible to store T(i), wherein scheduling queue eligibility is at least partially a function of (i) $W^i$, and (ii) the scheduling weights assigned to the scheduling queues, and (2) initially storing T(i) in the scheduling queue having the highest scheduling weight of each scheduling queue eligible to store T(i); and for each T(i) stored in the selected scheduling queue, redistributing T(i) at least partially as a function of (1) $W^i$, and (2) the scheduling weights assigned to the scheduling queues.

3. The method of claim 2 wherein each object is a cell, wherein the token redistribution step comprises (1) for each T(i) that is associated with a connection queue CQ(i) that does not remain backlogged after dequeuing a cell therefrom, dropping T(i), and (2) for each T(i) that is associated with a connection queue CQ(i) that remains backlogged after dequeuing a cell therefrom, (i) determining which scheduling queue from each scheduling queue that is eligible to store T(i) is next to be selected during a subsequent scheduling queue selecting step, and (ii) storing T(i) in the scheduling queue determined therefor.

4. The method of claim 3 wherein the serving counter is an N bit serving counter, wherein each serving value S is an N bit value wherein $S=S_{N-1}S_{N-2} \ldots S_0$, and wherein the scheduling weight assigning step includes, for each scheduling queue Q(k) of the N scheduling queues, assigning a scheduling weight thereto that corresponds to $2^k$, and wherein the serving value associating step includes, for each serving value S, associating scheduling queue Q(k) therewith if bit $S_k$ of S is the least significant bit of S that equals a predetermined number.

5. The method of claim 4 wherein each connection weight $W^i$ is an N bit value wherein $W^i=W_{N-1}{}^i W_{N-2}{}^i \ldots W_0{}^i$, wherein a scheduling queue Q(k) is an eligible scheduling queue for storing a token T(i) if bit $W_k{}^i$ of $W^i$ equals a predetermined number, wherein the step of initially storing each T(i) comprises initially storing T(i) in scheduling queue Q(hi) wherein hi is the maximum k for each k in $W^i$ where the bit $W_k{}^i$ equals a predetermined number.

6. The method of claim 5 wherein the scheduling queue determining step includes (1) storing T(i) in scheduling queue Q(p) if bit $W_p{}^i$ of $W^i$ equals a predetermined number, wherein p equals $N-1-\min\{t$, for all t's where $D_t{}^i$=the predetermined number$\}$, wherein $D^i$ equals $(S+I^i)\mod(2^N)$, wherein $I^i$ is an N bit binary value where bit $I_j{}^i$ of $I^i$ equals the predetermined number and all other bits of $I^i$ do not equal the predetermined number, and wherein $j^i$ equals $N-1-\max\{k$, for all k's where $W_k{}^i$=the predetermined number$\}$, and (2) storing T(i) in scheduling queue Q(hi) if bit $W_p{}^i$ of $W^i$ does not equal the predetermined number.

7. The method of claim 6 wherein the step of maintaining the serving counter comprises updating the serving value S such that at least one serving value that is associated with an empty scheduling queue is skipped as the serving counter cycles through the serving values of the serving cycle.

8. The method of claim 7 wherein the serving value updating step includes updating the serving counter from a current serving value $S_{CURRENT}$ to a next serving value $S_{NEXT}$ according to the formula $S_{NEXT}=(S_{CURRENT}+2^{N-1-\max\{x_c,q\}})\mod(2^N)$, wherein q represents the scheduling queue Q(q) having the highest scheduling weight among nonempty scheduling queues, and wherein $x_c$ represents the selected scheduling queue $Q(x_c)$.

9. The method of claim 1 wherein the step of maintaining the serving counter comprises updating the serving value such that at least one serving value that is associated with an empty scheduling queue is skipped as the serving counter cycles through the serving values of the serving cycle.

10. The method of claim 1 wherein each object is a packet having a length comprising one or more cells, said method further comprising:

for each connection queue CQ(i), maintaining a residual weight value $RW^i$ therefor, $RW^i$ being a representation of how much of the desired service amount remains available to CQ(i) for the portion of the serving cycle remaining from the current serving value of the serving counter, wherein the residual weight value maintaining step includes (1) for each $RW^i$, initially setting $RW^i$ equal to $W^i$, and (2) for each T(i) stored in the selected scheduling queue, adjusting $RW^i$ to reflect the length of the packet dequeued from connection queue CQ(i) during the connection queue serving step; and wherein the token storing step comprises storing each T(i) in a queue of the scheduling queue set at least partially as a function of (i) $W^i$, (ii) the scheduling weights assigned to the scheduling queues, and (iii) $RW^i$.

11. The method of claim 10 wherein the token storing step further comprises:

for each T(i), associating at least one scheduling queue therewith as a scheduling queue eligible to store T(i), wherein scheduling queue eligibility is at least partially a function of (1) $W^i$, (2) the scheduling weights assigned to the scheduling queues, and (3) $RW^i$; and for each T(i) stored in the selected scheduling queue, redistributing T(i) to a queue of the scheduling queue set at least partially as a function of (1) $W^i$, (2) the scheduling weights assigned to the scheduling queues, and (3) $RW^i$.

12. The method of claim 11 wherein the scheduling queue set comprises an active scheduling queue subset and an inactive scheduling queue subset, the active scheduling queue subset comprising a plurality N of scheduling queues $Q_A(N-1)$ through $Q_A(0)$ and a collection queue $CollQ_A$, and the inactive scheduling queue subset comprising a plurality N of scheduling queues $Q_B(N-1)$ through $Q_B(0)$ and a collection queue $CollQ_B$, said method further comprising:

toggling which scheduling queue subset is active and which scheduling queue subset is inactive each serving cycle;

wherein the scheduling queue selecting step comprises, for each serving value of the serving counter, selecting the scheduling queue associated therewith that belongs to the active scheduling queue subset; and wherein the token redistribution step further includes: (1) for each T(i) stored in the selected scheduling queue that is associated with a connection queue CQ(i) that is no longer backlogged after service thereto, dropping T(i), (2) for each T(i) stored in the selected scheduling queue that is associated with a connection queue CQ(i) that remains backlogged after service thereto and whose $RW^i$ value after the dequeued packet length adjustment step is a negative value, storing T(i) in a queue belonging to the inactive scheduling queue subset, and (3) for each T(i) stored in the selected scheduling queue that is associated with a connection queue CQ(i) that remains backlogged after service thereto and whose $RW^i$ value after the dequeued packet length adjustment step is a positive value, (i) determining a scheduling queue from among each scheduling queue that is eligible for storing T(i) that will next be served, and (ii) storing T(i) in the scheduling queue determined therefor.

13. The method of claim 12 wherein the step of adjusting each $RW^i$ value comprises, for each $RW^i$ value maintained for a connection queue CQ(i) served during the connection queue serving step, adjusting $RW^i$ by subtracting the length of the packet dequeued from CQ(i) during the connection queue serving step therefrom.

14. The method of claim 13 wherein the step of adjusting each $RW^i$ value further comprises, for each $RW^i$ value that is a negative value after the dequeued packet length subtraction step, further adjusting $RW^i$ by adding $W^i$ thereto, and wherein the token redistribution step further comprises (1) for each T(i) associated with a connection queue CQ(i) whose $RW^i$ value is a negative value after both the dequeued packet length subtraction step and the connection weight addition step, storing T(i) in the collection queue belonging to the inactive scheduling queue subset, and (2) for each T(i) associated with a connection queue CQ(i) whose $RW^i$ value is a negative value after the dequeued packet length subtraction step but a positive value after the connection weight addition step, (i) determining a scheduling queue from among each scheduling queue belonging to the inactive scheduling queue subset that is eligible to store T(i) that will next be selected, and (ii) storing T(i) in the scheduling queue determined therefor.

15. The method of claim 14 further comprising, redistributing each T(i) stored in the collection queue belonging to the active scheduling queue subset to a queue belonging to the inactive scheduling queue subset at least partially as a function of $RW^j$.

16. The method of claim 15 wherein the serving counter is an N bit binary serving counter, wherein each serving value S is an N bit value wherein $S=S_{N-1}S_{N-2}\ldots S_0$, and wherein the scheduling weight assigning step includes, for each scheduling queue Q(k) of the N scheduling queues of both scheduling queue subsets, assigning a scheduling weight thereto that coffesponds to 2k, and wherein the serving value associating step includes, for each serving value S, associating scheduling queue Q(k) therewith if bit $S^k$ of S is the least significant bit of S that equals a predetermined number.

17. The method of claim 16 wherein each connection weight $W^i$ is an N bit value wherein $W^i=W_{N-1}{}^i W_{N-2}{}^i \ldots W_0{}^i$, wherein each $RW^i$ value is an N+1 bit value wherein $RW^j=RW_N{}^i RW_{N-1}{}^i RW_{N-2}{}^i \ldots RW_0{}^i$, wherein bit $RW_N{}^i$ of $RW^j$ identifies whether $RW^i$ is a positive value or a negative value, wherein a scheduling queue Q(k) is an eligible scheduling queue to store T(i) if bit $RW_k{}^i$ of $RW^i$ equals a predetermined number, and wherein the step of initially storing each T(i) comprises initially storing T(i) in scheduling queue $Q(h^i)$ wherein $h^i$ is the maximum k for each k in $RW^i$ where the bit $RW_k{}^i$ equals the predetermined number.

18. The method of claim 17 wherein the step of maintaining the serving counter comprises updating the serving value S such that at least one serving value that is associated with an empty scheduling queue is skipped as the serving counter cycles through the serving values of the serving cycle.

19. The method of claim 18 wherein the serving value updating step includes updating the serving counter from a cuffent serving value $S_{CURRENT}$ to a next serving value $S_{NEXT}$ according to the formula $S_{NEXT}=(S_{CURRENT}+2^{N-1-max\{x^{c,q}\}})\mod(2^N)$, wherein q represents the scheduling queue Q(q) having the highest scheduling weight among nonempty scheduling queues, and wherein $x_c$ represents the selected scheduling queue $Q(x_c)$.

20. The method of claim 17 wherein each serving cycle comprises a plurality N of subrounds, each subround SR of the N subrounds comprising at least one serving value, wherein the step of maintaining the serving counter comprises updating the serving counter from a current serving value $S_{CURRENT}$ to a next serving value $S_{NEXT}$ according to the formula $S_{NEXT}=(S_{CURRENT}+2^{SR-1})\mod(2^N)$.

21. The method of claim 20 wherein the token storage step further comprises initially storing each T(i) in a scheduling queue of the scheduling queue set at least partially as a function of (1) $W^i$, (2) the scheduling weights assigned to the scheduling queues, (3) $RW^i$, and (4) SR, and wherein the token redistributing step further depends at least in part upon SR.

22. The method of claim 21 wherein scheduling queue eligibility further depends upon SR such that if Q(b) is an eligible scheduling queue for T(i) that is not eligible for selection during the current subround, then Q(a) is also an eligible scheduling queue for T(i) during the current subround, wherein Q(a) is the scheduling queue having the highest scheduling weight assigned thereto that is eligible to be selected during the current subround.

23. The method of claim 10 wherein each serving cycle comprises a plurality N of subrounds, each subround SR of the N subrounds comprising at least one serving value, wherein the step of maintaining the serving counter comprises updating the serving counter from a current serving value $S_{CURRENT}$ to a next serving value $S_{NEXT}$ according to the formula $S_{NEXT}=(S_{CURRENT}+2^{SR-1})\mod(2^N)$.

24. A scheduler for scheduling access to a common resource for a plurality of objects queued in a plurality of connection queues during a plurality of serving cycles, each serving cycle comprising a plurality of serving values, said scheduler comprising:
   a serving counter configured to cycle through the serving values of the serving cycle;
   a scheduling queue set comprising a plurality N of scheduling queues Q(N-1) through Q(0);
   a controller in communication with the serving counter, the scheduling queue set, and the plurality of connection queues, the controller being configured to (1) maintain a token T(i) for each connection queue CQ(i) that is backlogged, (2) assign a connection weight $W^i$ to each connection queue CQ(i), each $W^i$ being indicative of a desired amount of service to be provided to CQ(i) during a serving cycle, (3) assign a scheduling weight to each scheduling queue Q(k), (4) associate each serving value S with a scheduling queue Q(k) in a manner proportional to the scheduling weights assigned to the plurality of scheduling queues, (5) store each T(i) in a queue of the scheduling queue set at least partially as a function of (i) $W^i$, and (ii) the scheduling weights assigned to the scheduling queues, (6) select the scheduling queue that is associated with the current serving value of the serving counter, (7) for each T(i) stored in the selected scheduling queue, serve CQ(i) by dequeuing an object therefrom and providing the dequeued object to the common resource, and (8) update S after serving each CQ(i) that is associated with a token T(i) stored in the selected scheduling queue.

25. The scheduler of claim 24 wherein the controller is further configured to store tokens by (1) for each T(i), associating at least one scheduling queue therewith as a scheduling queue eligible to store T(i), wherein scheduling queue eligibility is at least partially a function of (i) $W^i$, and (ii) the scheduling weights assigned to the scheduling queues, (2) for each T(i), initially storing T(i) in the scheduling queue having the highest scheduling weight of each scheduling queue eligible for storing T(i), and (3) for each T(i) stored in the selected scheduling queue, redistributing T(i) at least partially as a function of (i) $W^i$, and (ii) the scheduling weights assigned to the scheduling queues.

26. The scheduler of claim 25 wherein each object is a cell, and wherein the controller is further configured to redistribute tokens by, (1) for each T(i) that is associated with a connection queue CQ(i) that does not remain backlogged after dequeuing a cell therefrom, dropping T(i), and (2) for each T(i) that is associated with a connection queue CQ(i) that remains backlogged after dequeuing a cell therefrom, (i) determining which scheduling queue from each scheduling queue that is eligible to store T(i) is next to be selected by the controller, and (ii) storing T(i) in the scheduling queue determined therefor.

27. The scheduler of claim 26 wherein the serving counter is an N bit serving counter, wherein each serving value S is an N bit value $S=S_{N-1}S_{N-2}\ldots S_0$, and wherein the controller is further configured to associate each serving value S with a scheduling queue Q(k) by associating a serving value S with scheduling queue Q(k) if bit $S_k$ of S is the least significant bit of S that equals a predetermined number.

28. The scheduler of claim 27 wherein each connection weight $W^i$ is an N bit value $W^i=W_{N-1}{}^i W_{N-2}{}^i \ldots W_0{}^i$, wherein a scheduling queue Q(k) is an eligible scheduling queue eligible to store T(i) if bit $W_k{}^i$ of $W^i$ equals a predetermined number, and wherein the controller is further configured to initially store each T(i) in scheduling queue $Q(h^i)$ wherein $h^i$ is the maximum k for each k in $W^i$ where bit $W_k{}^i$ equals the predetermined number.

29. The scheduler of claim 28 wherein the controller is further configured to, for each T(i) stored in the selected scheduling queue, determine a scheduling queue into which to redistribute T(i) by (1) storing T(i) in scheduling queue Q(p) if bit $W_p{}^i$ of $W^i$ equals a predetermined number, wherein p equals N−1−min{t, for all t's where $D_t{}^i$=the predetermined number}, wherein $D^i$ equals $(S+I^i)\mod(2^N)$, wherein $I^i$ is an N bit value where bit $I_{j'}{}^i$ of $I^i$ equals the predetermined number and all other bits of $I^i$ do not equal the predetermined number, and wherein j' equals N−1−max{k, for all k's where $W_k{}^i$=the predetermined number}, and (2) storing T(i) in scheduling queue $Q(h^i)$ if bit $W_p{}^i$ of $W^i$ does not equal the predetermined number.

30. The scheduler of claim 29 wherein the controller is further configured to update the serving value S by controlling the serving counter such that at least one serving value that is associated with an empty scheduling queue is skipped.

31. The scheduler of claim 30 wherein the controller is configured to update S from a current serving value $S_{CURRENT}$ to a next serving value $S_{NEXT}$ according to the formula $S_{NEXT}=(S_{CURRENT}+2^{N-1-max\{x_c,q\}})\mod(2^N)$, wherein q represents the scheduling queue Q(q) having the highest scheduling weight among nonempty scheduling queues, and wherein $x_c$ represents the selected scheduling queue $Q(x_c)$.

32. The scheduler of claim 24 wherein the controller is further configured to update the serving value S by controlling the serving counter such that at least one serving value that is associated with an empty scheduling queue is skipped.

33. The scheduler of claim 24 wherein each object is a packet having a length comprising one or more cells, wherein the controller is further configured to:

for each CQ(i), maintain a residual weight value $RW^i$ therefor, $RW^i$ being a representation of how much of the desired service amount remains available to CQ(i) for the portion of the serving cycle remaining from the current serving value of the serving counter, the residual weight value maintenance comprising (1) for each $RW^i$, initially setting $RW^i$ equal to $W^i$, and (2) for each T(i) stored in the selected scheduling queue, adjusting $RW^i$ to reflect the length of the packet dequeued from CQ(i) during service thereto; and store each T(i) in a queue of the scheduling queue set at least partially as a function of (1) $W^i$, (2) the scheduling weights assigned to the scheduling queues, and (3) $RW^i$.

34. The scheduler of claim 33 wherein the controller is further configured to:

for each T(i), associate at least one scheduling queue therewith as a scheduling eligible to store T(i), wherein scheduling queue eligibility is at least partially a function of (1) $W^i$, (2) the scheduling weights assigned to the scheduling queues, and (3) $RW^i$; and for each T(i) stored in the selected scheduling queue, redistribute T(i) at least partially as a function of (1) $W^i$, (2) the scheduling weights assigned to the scheduling queues, and (3) $RW^i$.

35. The scheduler of claim 34 wherein the scheduling queue set comprises an active scheduling queue subset and an inactive scheduling queue subset, the active scheduling queue subset comprising a plurality N of scheduling queues $Q_A(N-1)$ through $Q_A(0)$ and a collection queue $CollQ_A$, and the inactive scheduling queue subset comprising a plurality N of scheduling queues $Q_B(N-1)$ through $Q_B(0)$ and a collection queue $CollQ_B$; and wherein the controller is further configured to (1) toggle which scheduling queue subset is active and which scheduling queue subset is inactive each serving cycle, (2) select a scheduling queue from the serving value by selecting the scheduling queue belonging to the active scheduling queue subset that is associated with the current serving value of the serving counter, and (3) redistribute tokens by (i) for each T(i) stored in the selected scheduling queue that is associated with a connection queue that is no longer backlogged after service thereto, dropping T(i), (ii) for each T(i) stored in the selected scheduling queue that is associated with a connection queue CQ(i) that remains backlogged after service thereto and whose $RW^i$ value, after being adjusted for the length of the dequeued packet, is a negative value, storing T(i) in a queue belonging to the inactive scheduling queue subset, and (iii) for each T(i) that is stored in the selected scheduling queue that is associated with a connection queue CQ(i) that remains backlogged after service thereto and whose $RW^i$ value, after being adjusted for the length of the dequeued packet, is a positive value, (a) determining a scheduling queue from among each scheduling queue that is eligible for storing T(i) that will next be selected, and (b) storing T(i) in the scheduling queue determined therefor.

36. The scheduler of claim 35 wherein the controller is further configured to maintain residual weight values by, for each $RW^i$ value maintained for a connection queue CQ(i) having a token T(i) stored in the selected scheduling queue, adjusting $RW^i$ by subtracting the length of the packet dequeued from CQ(i) therefrom.

37. The scheduler of claim 36 wherein the controller is further configured to (1) maintain residual weight values by, for each $RW^i$ value that is a negative value after subtraction by the dequeued packet length, further adjusting $RW^i$ by adding $W^i$ thereto, and (2) redistribute tokens by (i) for each T(i) associated with a connection queue CQ(i) whose $RW^i$ value is a negative value after both subtraction by dequeued packet length and addition by connection weight, storing T(i) in the collection queue belonging to the inactive scheduling queue subset, and (ii) for each T(i) associated with a connection queue CQ(i) whose $RW^i$ value is a negative value after subtraction by dequeued packet length but a positive value after addition by connection weight, (a) determining a scheduling queue from among each scheduling queue belonging to the inactive scheduling queue subset that is eligible to store T(i) that will next be served, and (b) storing T(i) in the scheduling queue determined therefor.

38. The scheduler of claim 37 wherein the scheduler is further configured to, at the conclusion of each serving cycle, redistribute each T(i) stored in the collection queue belonging to the active scheduling queue subset to a queue belonging to the inactive scheduling queue subset at least partially as a function of $RW^i$.

39. The scheduler of claim 38 wherein the serving counter is an N bit serving counter, wherein each serving value S is an N bit value wherein $S=S_{N-1}S_{N-2} \ldots S_0$, and wherein the controller is futher configured to (1) assign scheduling weights by, for each scheduling queue Q(k) of the N scheduling queues of both scheduling queue subsets, assigning a scheduling weight thereto that corresponds to $2^k$, and (2) associate scheduling queues with serving values by, for each serving value S, associating scheduling queue Q(k) therewith if bit $S_k$ of S is the least significant bit of S that equals a predetermined number.

40. The scheduler of claim 39 wherein each connection weight $W^i$ is an N bit value wherein $W^i = W_{N-1}{}^i W_{N-2}{}^i \ldots W_0{}^i$, wherein each $RW^i$ value is an N+1 bit value wherein $RW^i = RW_N{}^i RW_{N-1}{}^i RW_{N-2}{}^i \ldots RW_0{}^i$, wherein bit $RW_N{}^i$ of $RW^i$ identifies whether $RW^i$ is a positive value or a negative value, and wherein a scheduling queue Q(k) is an eligible scheduling queue to store T(i) if bit $RW_k{}^i$ of $RW^i$ equals a predetermined number.

41. The scheduler of claim 40 wherein the controller is further configured to update the serving value by updating the serving counter such that at least one serving value that is associated with an empty scheduling queue is skipped.

42. The scheduler of claim 41 wherein the controller is further configured to update the serving value by updating the serving counter from a current serving value $S_{CURRENT}$ to a next serving value $S_{NEXT}$ according to the formula $S_{NEXT} = (S_{CURRENT} + 2^{N-1-max\{x_c, q\}}) \mod (2^N)$, wherein q represents the scheduling queue Q(q) having the highest scheduling weight among nonempty scheduling queues, and wherein $x_c$, represents the selected scheduling queue $Q(x_c)$.

43. The scheduler of claim 40 wherein each serving cycle comprises a plurality N of subrounds, each subround SR of the N subrounds comprising at least one serving value, and wherein the controller is further configured to update the serving value by updating the serving counter from a current serving value $S_{CURRENT}$ to a next serving value $S_{NEXT}$ according to the formula $S_{NEXT} = (S_{CURRENT} + 2^{SR-1}) \mod (2^N)$.

44. The scheduler of claim 43 wherein the controller is further configured to store tokens by initially storing each T(i) in a scheduling queue of the scheduling queue set at least partially as a function of (1) $W^i$, (2) the scheduling weights assigned to the scheduling queues, (3) $RW^i$, and (4) SR, and wherein the token redistributing step further depends at least in part upon SR.

45. The scheduler of claim 44 wherein scheduling queue eligibility further depends upon SR such that if Q(b) is an eligible scheduling queue for T(i) that is not eligible for selection during the current subround, then Q(a) is also an eligible scheduling queue for T(i) during the current subround, wherein Q(a) is the scheduling queue having the highest scheduling weight assigned thereto that is eligible to be selected during the current subround.

46. The scheduler of claim 33 wherein each serving cycle comprises a plurality N of subrounds, each subround SR of the N subrounds comprising at least one serving value, and wherein the controller is further configured to update the serving value by updating the serving counter from a current serving value $S_{CURRENT}$ to a next serving value $S_{NEXT}$ according to the formula $S_{NEXT} = (S_{CURRENT} + 2^{SR-1}) \mod (2^N)$.

47. A method of scheduling access to a common resource for cell traffic, the cell traffic comprising a plurality of cells queued in a plurality of connection queues, said method comprising:

maintaining a scheduling queue set comprising a plurality N of scheduling queues O(N−1) through Q(0);

for a plurality of tokens, storing each token T(i) in a queue of the scheduling queue set, each T(i) having a connection queue CO(i) associated therewith;

maintaining a serving counter, the serving counter being configured to repeatedly cycle through a plurality of serving values comprising a serving cycle, each serving value S having a scheduling queue associated therewith;

selecting the scheduling queue associated with the current serving value S of the serving counter;

for each T(i) stored in the selected scheduling queue, serving CO(i) by dequeuing at least one cell therefrom and providing each dequeued cell to the common resource;

updating S after serving the CO(i) associated with each T(i) stored in the selected scheduling queue;

assigning a scheduling weight to each scheduling queue;

associating each serving value with a scheduling queue in a manner proportional to the scheduling weights assigned to the scheduling queues;

for each CQ(i), assigning a connection weight $W^i$ thereto; and wherein the token storing step comprises storing each T(i) in a scheduling queue eligible to store T(i), scheduling queue eligibility for T(i) depending at least in part upon $W^i$ and the scheduling weights assigned to the scheduling queues.

48. The method of claim 47 wherein the token storing step further comprises redistributing each T(i) stored in the selected scheduling queue after serving CQ(i).

49. The method of claim 48 wherein the redistribution step comprises moving each T(i) stored in the selected scheduling queue to an eligible scheduling queue that will be selected the soonest of each scheduling queue eligible to store T(i) if CQ(i) remains backlogged after service thereto.

50. The method of claim 49 wherein the redistribution step includes dropping each T(i) stored in the selected scheduling queue if CQ(i) is no longer backlogged after service thereto.

51. The method of claim 50 wherein the serving value updating step includes updating S from a current value to a next value such that at least one serving value associated with an empty scheduling queue is skipped.

52. The method of claim 48 wherein the cells queued in the connection queues represent packets, each packet comprising one or more cells queued in the same connection queue, said method further comprising, for each CQ(i), maintaining a residual weight value $RW^i$ therefor, wherein scheduling queue eligibility further depends in part upon $RW^i$, and wherein the serving step includes, for each T(i) stored in the selected scheduling queue, serving CQ(i) by dequeuing a packet from CQ(i) and providing each dequeued packet to the common resource.

53. The method of claim 52 wherein the scheduling queue set comprises an active scheduling queue subset and an inactive scheduling queue subset, the active scheduling queue subset comprising a plurality N of scheduling queues $Q_A(N-1)$ through $Q_A(\mathbf{0})$ and a collection queue $CollQ_A$, the inactive scheduling queue subset comprising a plurality N of scheduling queues $Q_B(N-1)$ through $Q_B(\mathbf{0})$ and a collection queue $CollQ_B$, said method further comprising:

toggling which scheduling queue subset is active and which scheduling queue subset is inactive after the each serving cycle; and wherein the scheduling queue selecting step comprises selecting the scheduling queue belonging to the active scheduling queue subset that is associated with the current serving value S of the serving counter.

54. The method of claim 53 wherein the token redistribution step comprises, after serving a connection queue CQ(i), redistributing T(i) at least partially as a function of $W^i$, $RW^i$, and the scheduling weights assigned to the scheduling queues.

55. The method of claim 54 wherein the token redistribution step further comprises, after serving a connection queue CQ(i):
   if CQ(i) is no longer backlogged after dequeuing a packet therefrom, dropping T(i);
   if CQ(i) remains backlogged after dequeuing a packet therefrom, (1) moving T(i) to an eligible scheduling queue that will be selected the soonest of each scheduling queue eligible to store T(i) if $RW^i$ is within a first predetermined range, (2) moving T(i) to an eligible scheduling queue belonging to the inactive scheduling queue subset that will be served the soonest of each scheduling queue belonging to the inactive scheduling queue subset that is eligible to store T(i) if $RW^i$ is within a second predetermined range, and (3) moving T(i) to the collection queue of the inactive scheduling queue subset if $RW^i$ is within a third predetermined range, each predetermined range being nonoverlapping.

56. The method of claim 55 wherein the step of maintaining each $RW^i$ value comprises:
   initially setting each $RW^i$ value equal to $W^i$;
   after serving CQ(i), adjusting $RW^i$ to account for the number of cells comprising the dequeued packet; and
   after service to a CQ(i) is complete for a serving cycle, adding $W^i$ thereto.

57. The method of claim 56 wherein the token storing step includes, moving each T(i) stored in the collection queue belonging to the active scheduling queue subset to a queue belonging to the inactive scheduling queue subset at least partially as a function of $RW^i$.

58. The method of claim 57 wherein the step of moving each T(i) stored in the collection queue belonging to the active scheduling queue subset comprises (1) moving T(i) to an eligible scheduling queue belonging to the inactive scheduling queue subset that will be served the soonest of each scheduling queue belonging to the inactive scheduling queue subset that is eligible to store T(i) if $RW^i$ is within the second predetermined range, and (2) moving T(i) to the collection queue of the inactive scheduling queue subset if $RW^i$ is within the third predetermined range.

59. The method of claim 58 wherein each serving cycle comprises a plurality N of subrounds, each subround SR comprising at least one serving value, and wherein the serving value updating step increasing S by $2^{SR-1}$, and wherein the queue into which each token is stored further depends at least in part upon SR.

60. The method of claim 58 wherein the serving value updating step includes updating S from a current value to a next value such that at least one serving value associated with an empty scheduling queue is skipped.

61. A method of scheduling access to a common resource for a plurality of packets queued in a plurality of connection queues, each packet comprising one or more cells, said method comprising:
   maintaining a serving counter, the serving counter being configured to repeatedly cycle through a plurality of serving values comprising a serving cycle;
   for each connection queue CQ(i), determining a desired amount of service to allot thereto during each serving cycle;
   for each CQ(i), tracking how much of that desired service amount is used during a serving cycle;
   maintaining a scheduling queue set comprising a plurality N of scheduling queues Q(N−1) through Q(0);
   assigning a scheduling weight to each scheduling queue;
   associating each serving value with a scheduling queue in a manner proportional to the scheduling weights assigned to the scheduling queues;
   for each CQ(i) that is backlogged, maintaining a token T(i) therefor;
   for each T(i), initially storing T(i) in a queue of the scheduling queue set at least partially as a function of the desired service amount for CQ(i), the tracked service amount usage for CQ(i), and the scheduling weights assigned to the scheduling queues;
   selecting the scheduling queue associated with the current serving value S of the serving counter;
   for each T(i) stored in the selected scheduling queue, (1) serving CQ(i) by dequeuing a packet therefrom and providing the dequeued packet to the common resource and (2) redistributing T(i) to a queue of the scheduling queue set at least partially as a function of the desired service amount for CQ(i), the tracked service amount usage for CQ(i), and the scheduling weights assigned to the scheduling queues such that service to CQ(i) during a serving cycle does not substantially exceed the desired service amount for CQ(i); and
   updating S after serving the CQ(i) associated with each T(i) stored in the selected scheduling queue.

62. A method of scheduling access to a common resource for a plurality of packets queued in a plurality of connection queues, each packet comprising one or more cells, said method comprising:
   maintaining a serving counter configured to repeatedly cycle through a plurality of serving values comprising a serving cycle;
   maintaining a scheduling queue set, the scheduling queue set comprising an active scheduling queue subset and an inactive scheduling queue subset, the active scheduling queue subset comprising a plurality N of scheduling queues $Q_A(N-1)$ through $Q_A(0)$ and a collection queue $CollQ_A$, the inactive scheduling queue subset comprising a plurality N of scheduling queues $Q_B(N-1)$ through $Q_B(0)$ and a collection queue $CollQ_B$;
   assigning a scheduling weight to each scheduling queue Q(k) of the scheduling queue set;
   associating each serving value with a scheduling queue in a manner proportional to the scheduling weights assigned to the scheduling queues;
   for each connection queue CQ(i), (1) assigning a connection weight $W^i$ thereto that is representative of a desired amount of service to be allotted to connection queue CQ(i) during each serving cycle, and (2) maintaining a residual weight value $RW^i$ therefor, $RW^i$ being a running representation of how much of the desired service amount remains available to CQ(i) for the portion of the serving cycle remaining from the current serving value of the serving counter;
   for each CQ(i) that is backlogged, maintaining a token T(i) associated therewith;
   initially storing each T(i) in a queue of the scheduling queue set at least partially as a function of $W^i$, $RW^i$, and the scheduling weights assigned to the scheduling queues;

for each serving value S of the serving counter, (1) selecting the scheduling queue associated therewith that belongs to the active scheduling queue subset, and (2) for each T(i) stored in the selected scheduling queue, (i) serving CQ(i) by dequeuing a packet therefrom and providing the dequeued packet to the common resource, and (ii) redistributing T(i) at least partially as a function of $W^i$, $RW^i$, and the scheduling weights assigned to the scheduling queues such that CQ(i) is limited to an amount of service that approximates $W^i$ during each serving cycle over a plurality of serving cycles; and toggling which scheduling queue subset is active and which scheduling subset is inactive each serving cycle.

* * * * *